United States Patent [19]
Emerson et al.

[11] Patent Number: 5,784,558
[45] Date of Patent: Jul. 21, 1998

[54] METHOD AND APPARATUS FOR TESTING OF EXTENDED ISDN BRI SERVICE

[75] Inventors: Earl A. Emerson, Somerset; Henry J. Gonzalez, Piscataway, both of N.J.

[73] Assignee: Integrated Network Corporation, Bridgewater, N.J.

[21] Appl. No.: 635,412

[22] Filed: Apr. 26, 1996

[51] Int. Cl.⁶ .................................. H04L 1/14; H04J 3/14
[52] U.S. Cl. .................................. 395/200.6; 395/200.67; 395/200.54; 395/183.15; 395/183.01; 370/524; 370/249; 370/251; 379/5; 379/10; 379/12; 379/29; 379/353; 379/399
[58] Field of Search .................. 395/200.14, 183.01, 395/183.3, 183.7, 183.12, 15, 17, 183.22, 184.01, 500; 370/524, 241–249, 251–252, 465–468, 545, 532, 538, 358, 359, 375, 376, 904, 914; 379/5, 10, 12, 27, 29, 50, 93.01, 353, 399

[56] References Cited

U.S. PATENT DOCUMENTS

| | | | |
|---|---|---|---|
| 4,998,240 | 3/1991 | Williams | 370/17 |
| 5,140,625 | 8/1992 | Reum et al. | 379/5 |
| 5,187,705 | 2/1993 | Mano | 370/15 |
| 5,189,663 | 2/1993 | Williams | 370/17 |
| 5,331,629 | 7/1994 | Tabata et al. | 370/57 |
| 5,394,145 | 2/1995 | Gupata et al. | 341/73 |
| 5,442,621 | 8/1995 | Ise et al. | 370/251 |
| 5,541,933 | 7/1996 | Basnuevo et al. | 371/5.5 |
| 5,553,059 | 9/1996 | Emerson et al. | 370/14 |
| 5,566,161 | 10/1996 | Hartmann et al. | 370/15 |

OTHER PUBLICATIONS

"Pulsecom D4 ISDN-U Basic Rate 2B1Q U-Interface," *Practice Section 1421, Pulse Communications, Inc. 2900 Towerview Road, Herndon, Virginia 22071–3285*, pp. 1–18, Business Manuall, (Mar. 1995).

"Loopback Code Detection," *TA–TSY–000077, Issue 3* pp. 12–25 (Apr. 1986).

"ISDN Basic Access Transport System Requirements—Requirements for LT [Line Units]," *TR–NWT–000397, Issue 3*, pp. Mar. 1–3 1912, FIGs. 3–1, 3–2 (Dec. 1993).

"The mp-eoc Embedded Operations Channel," *TR–TSY–000829, Section 11.3 of OTGR*, pp. 24–27, 85, Issue 1 (Nov. 1989).

"Digital Test Acess Unit (DTAU)," *TR–TSY–000476, Section 6.3 of OTGR*, Issue 2 (Feb. 1988).

"ISDN Basic Access Transport System Requirements—Interfaces for Multiplexing Basic Acess on DS1 & Higher Rate Facilities," *TR–NWT–000397, Issue 3*, pp. 10.4–10.7 (Dec. 1993).

*Primary Examiner*—Emanuel Todd Voeltz
*Assistant Examiner*—Tuan Q. Dam
*Attorney, Agent, or Firm*—Hamilton, Brook, Smith & Reynolds, P.C.

[57] ABSTRACT

An enhanced ISDN-DP transmission device of the present invention allows for testing of ISDN-protocol communication paths using an existing DDS-protocol test infrastructure. The ISDN-DP unit receives a DDS test command and determines whether the command was intended for the immediate receiving unit or a tandem unit. If the command is intended for the immediate ISDN-DP unit, the unit processes the command. If the command is intended for another ISDN device in the transmission path, the ISDN-DP converts the DDS-protocol command to an ISDN-protocol command and transmits the converted ISDN command to an adjacent tandem ISDN device in the communication path in an upstream or downstream direction. After the test path is enabled, loopback testing is available on all available ISDN bandwidth, including the B1, B2 and D+ channels, from a DDS-protocol test set. DDS-protocol test access is available from a plurality of locations including: multiplexed bit stream access at a digital crossconnect switch; metallic access at a DS0 interface; faceplate access at the ISDN-DP unit.

27 Claims, 12 Drawing Sheets

METHOD AND APPARATUS FOR TESTING OF EXTENDED ISDN BRI SERVICE

BACKGROUND OF THE INVENTION

In the early 1970's telephone companies introduced the Digital Data Service (DDS) data transfer protocol to provide a customer with high speed digital signal transfer capability at rates of up to 64 kilobits per second (kbps). A customer gains access to the DDS network through a local loop interface, which provides full-duplex bidirectional data transmission between the customer premises and the network. The DDS local loop is a private-line service, which means that 64 kbps bandwidth is dedicated to the customer on a full-time basis. Because DDS is a private-line service, the customer is required to pay for continuous service, which is typically quite expensive. While the DDS system is appealing to large customers who exchange data regularly, such as financial institutions, it is generally cost prohibitive for small companies requiring infrequent data exchanges and for individuals operating personal computers.

In recent years, with the popularity of personal computers and the explosion of on-line information services and networks such as the Internet, even private individuals and small companies require ever-increasing bandwidth. The traditional data transfer method for small companies and individuals operating personal computers is modem technology in which data is exchanged over standard telephone lines. However, modem technology has essentially reached a bandwidth plateau of approximately 28.8 kbps. With the abundance of information available from on-line services, including large files with sophisticated graphics, users today are facing excessive delays in retrieving information.

To address this problem, telephone companies and other service providers introduced the Integrated Services Digital Network (ISDN) Basic Rate Interface (BRI) which delivers bandwidths of up to 128 kbps. ISDN BRI offers a "dial-up" interface option which means that customers request access from an ISDN network switch when access is required. This service provides bandwidth on an as-needed basis, and consequently customers pay only for the time when they are using it. For this reason, this ISDN BRI service appeals to large companies, small companies, and some private individuals who require high bandwidth.

As shown in prior art block diagram of FIG. 1, a typical ISDN network comprises digital subscriber loops (DSL) 42A–D, a carrier facility 20, and transmission devices 66A–D which provide a communication path between an ISDN network switch 36 at the office of the service provider and an ISDN network termination 40A–C at a customer site. The DSLs 42A–D, commonly referred to as "two-wire pairs", are typically less than 18,000 feet in length and comprise a two-wire pair connecting the network termination 40 and an ISDN transmission device 66A. The ISDN transmission devices 66A–D provide an interface between the DSLs 42A–D and the carrier facility 20.

The ISDN transmission devices 66A–D, commonly referred to as channel units, are mounted in a channel bank 68A–B, for example a D4 channel bank. The bank of channel units operate to multiplex/demultiplex the full-bandwidth carrier facility 20 signal timeslots and distribute the timeslots over the respective DSLs 42A–C. Each DSL is connected to a network termination 40A–C at each respective customer site.

In a typical full-bandwidth ISDN configuration, the carrier facility 20 comprises a T1 network operating at 1.544 megabits per second (Mbps). The T1 bandwidth comprises 24 multiplexed time slots of 64 kbps each. Each ISDN channel unit 66A–D uses three time slots on the T1 network, for a total of 192 kbps bandwidth. The three time slots comprise two 64 kbps bearer channels—or "B channels", labeled B1 and B2 and a 64 kbps "D+ channel". The B1 and B2 channels are commonly used for data transmission. The D+ channel is generally used for overhead, and includes a 16 kbps "D channel" which is typically used for call initiation and disconnection purposes. The carrier facility 20 protocol is defined in the industry standard ANSI T1.601 specification and in Bellcore document TR-NWT-000397.

The B1 and B2 channels are transmitted onto the DSLs 42A–C by the channel units 66A–C, along with the 16 kbps D channel portion of the D+ channel and a 16 kbps overhead channel OH, for a total bandwidth of 160 kbps. The overhead channel OH is populated with data transmitted on the carrier facility D+ channel according to standard protocol defined in Bellcore document TR-NWT-000397.

An ISDN channel unit 66D with its two-wire pair 42D terminals facing the direction of the network switch 36 is commonly referred to as a line unit network terminal (LUNT), while a channel unit 66A–C configured with its two-wire pair 42A–C terminals facing the direction of the customer premises 40A–C is referred to a line unit line terminal (LULT). For purposes of the present specification, communication in the direction from the ISDN network switch 36 to the customer premises 40A–C will be referred to as the "downstream" direction indicated by arrow 62, while the reverse direction of communication will be referred to as the "upstream" direction indicated by arrow 64.

With widespread ISDN BRI subscription, local telephone companies are now faced with the challenge of providing efficient, reliable and maintainable ISDN BRI services in a variety of access configurations. A key aspect of this is network testability. Traditional ISDN BRI testing is based on the embedded operations channel (eoc) maintenance procedures described in Bellcore specifications TR-NWT-000397 and TR-TSY-000829. The eoc maintenance procedures employ a hierarchical test structure where testing is initiated only from the ISDN BRI network switch 36 commonly referred to as the "network". A test typically involves a loop test comprising plurality of test patterns transmitted along the communication path downstream from the network switch 36 in the direction shown by arrow 62 The test patterns are "looped back" at a predetermined ISDN channel unit 66A–D or at the customer network termination 40A–C, and returned upstream in the direction shown by arrow 64 to the network switch 36. The network switch 36 inspects the returned data for communication errors.

By initiating loopback tests at various adjacent ISDN channel units along a communication path, the test operator can verify the integrity of the communication path and can isolate the location of error sources. As an example, if channel unit 66D, configured as a LUNT, is assigned as the loopback point, the loopback test sourced at the ISDN switch 36 would transmit test data downstream 62 to the LUNT 66D. The LUNT 66D responds by returning the data upstream 64 to the network switch 36. This test would verify the integrity of the DSL 42D and the LUNT 66D, along a communication path represented by dashed lines 70A. In a similar manner, LULT 66A could be instructed to operate as the loopback point to verify the integrity of the DSL 42D, the LUNT 66D, the carrier 20, and LULT 66A, along the communication path represented by dashed lines 70B. The network termination 40A could also be looped back to verify the integrity of the entire network along communication path 70C.

Current ISDN BRI testing procedures require all ISDN BRI maintenance to be performed from the test console 54 of the ISDN network switch 36 or by non-standard or proprietary manual procedures at the ISDN BRI channel units 66A–D or at the customer site 40A. Testing is straightforward when the communication path 70E to be tested is a direct link over a two-wire pair 42E between the ISDN network switch 36 and a network termination 40E at the customer premises. However, the reach of an ISDN BRI service is commonly extended up to several miles using intermediate tandem transmission devices 66A–D located in multiplexers, channel banks 68A–B or digital carrier systems 20, for example T1 networks. This complicates maintenance responsibility as the various intermediate transmission units 66A–D frequently cross boundaries between multiple independent organizations within a local telephone company. In many cases all responsible organizations may not have access to the test console 54 at the ISDN network switch 36. Under these conditions, an ISDN provider must either cooperate with those parties having access to the test console 54 at the ISDN network switch 36 or must dispatch highly-skilled support personnel directly to the channel units 66A–D within their jurisdiction to manually perform non-standard or proprietary maintenance procedures.

The DDS test environment is popular and well-rooted in modern communication systems. Many DDS test operators have years of experience and have undergone extensive training in the DDS environment. In the modern DDS test environment illustrated in prior art FIG. 2, a test operator employs a standard DDS test system 44 coupled to a test trunk 21 of a standard Digital Crossconnect Switch (DCS) 34. The DCS 34 is a standard unit on a carrier facility 20 such as a T1 network.

In a typical test, the DDS test operator issues in-band loopback commands, such as DDS latching loopbacks, to various DDS transmission devices, including an office channel unit dataport (OCU/DP) 24A–B and a channel/data service unit (CSU/DSU) 26 at the customer premises. The selected device responds by entering into a loopback mode, wherein all data received in a downstream direction 62 by the device is retransmitted upstream 64 to the test system 44. After placing a device in loopback mode, the operator transmits various stress patterns to test the circuit. The returned data is inspected for transmission errors. The test command protocols are defined in Bellcore specification TA-TSY-000077.

The OCU/DP 24A–B transmission unit is the interface between the T1 network 20 and the subband local loop 28A–B operating at or less than 64 kbps. It is commonly configured in a single slot of a D4 channel bank 22A–B and provides a service analogous to that of a LULT in an ISDN configuration. Similarly, the DDS CSU/DSU 26A–B is analogous in function to an ISDN network termination 40.

Modern ISDN hardware was developed to merge into the existing infrastructure of digital transmission systems. Therefore, the communication path between an ISDN network terminal at a customer premises and the ISDN switch at a service provider site may employ transmission equipment compatible with both DDS and ISDN hardware, for example a D4 channel bank 22, and a DCS 34. The ISDN BRI hardware communicates data according to a different protocol than the DDS hardware. Consequently, while two ISDN devices can effectively communicate across the existing hardware infrastructure, most ISDN devices are currently not responsive to DDS protocol commands.

To overcome this incompatibility problem, some vendors have designed ISDN transmission hardware which responds to certain DDS commands. For example, a channel unit manufactured by one vendor is an ISDN unit designed for insertion into a channel bank which includes a DDS operating mode. This unit will be referred to herein as a prior art "ISDN-U" unit. It is described in Pulsecom® "D4 ISDN-U, Basic Rate 2B1Q U-Interface", Practice Session 1421, Document 1D, March 1995. The ISDN-U unit is designed for a particular limited application as a replacement for a DDS end office channel. It therefore suffers from several shortcomings as will be described in further detail below.

SUMMARY OF THE INVENTION

The present invention is directed to an apparatus and method for testing communication paths employing ISDN transmission equipment with existing DDS test infrastructure. In particular, the present invention is directed to an ISDN transmission device which responds to DDS test commands intended for that device. If the DDS command is intended for another ISDN device in the transmission path, the present invention converts the DDS command to an ISDN command and transmits the converted ISDN command to an adjacent tandem ISDN device in the communication path, regardless of whether the adjacent device is upstream or downstream of the transmission device receiving the command.

The ISDN transmission device of the present invention responds to existing DDS test procedures initiated from standard DDS digital test systems. ISDN service providers therefore can take advantage of their current investment in existing DDS test equipment and in maintenance personnel highly trained in maintaining DDS systems, while continuing to provide high-bandwidth ISDN service to customers.

In this manner, the present invention allows for DDS-protocol testing of an ISDN-protocol communication channel in a manner which is transparent to a test operator trained in DDS test procedures. Testing can be performed at a DDS-protocol test unit from a plurality of traditional test access locations already in place in modern configurations, including: access at a DCS test trunk, metallic access at a DS0 interface, and access at the faceplate of the device.

BRIEF DESCRIPTION OF THE DRAWINGS

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

DETAILED DESCRIPTION OF PREFERRED EMBODIMENTS

Before proceeding with a description of the present invention, it may be helpful to point out a few limitations found in the prior art ISDN-U unit. In DDS mode, the ISDN-U unit emulates a pair of DDS OCU data ports. To effect this, either or both of the ISDN B1 and B2 channels are encoded onto the T1 to provide a single or dual DDS circuit. A DDS loopback code transmitted downstream from the network is detected and converted into a corresponding ISDN loopback command. A DDS OCU loopback command causes a loopback at the ISDN-U card. A DDS CSU and DSU loopback command causes a loopback at the customer network termination 40.

The ISDN-U embodiment suffers from several limitations. When DDS mode is enabled, the ISDN "D" channel is automatically provisioned off. Because the D channel is disabled, the ISDN-U unit, when configured for DDS test mode, is not capable of supporting switched ISDN service, since ISDN employs the D channel for signaling call set up and disconnect. Currently, switched ISDN service is the most common type of ISDN service provided.

Figure 1:
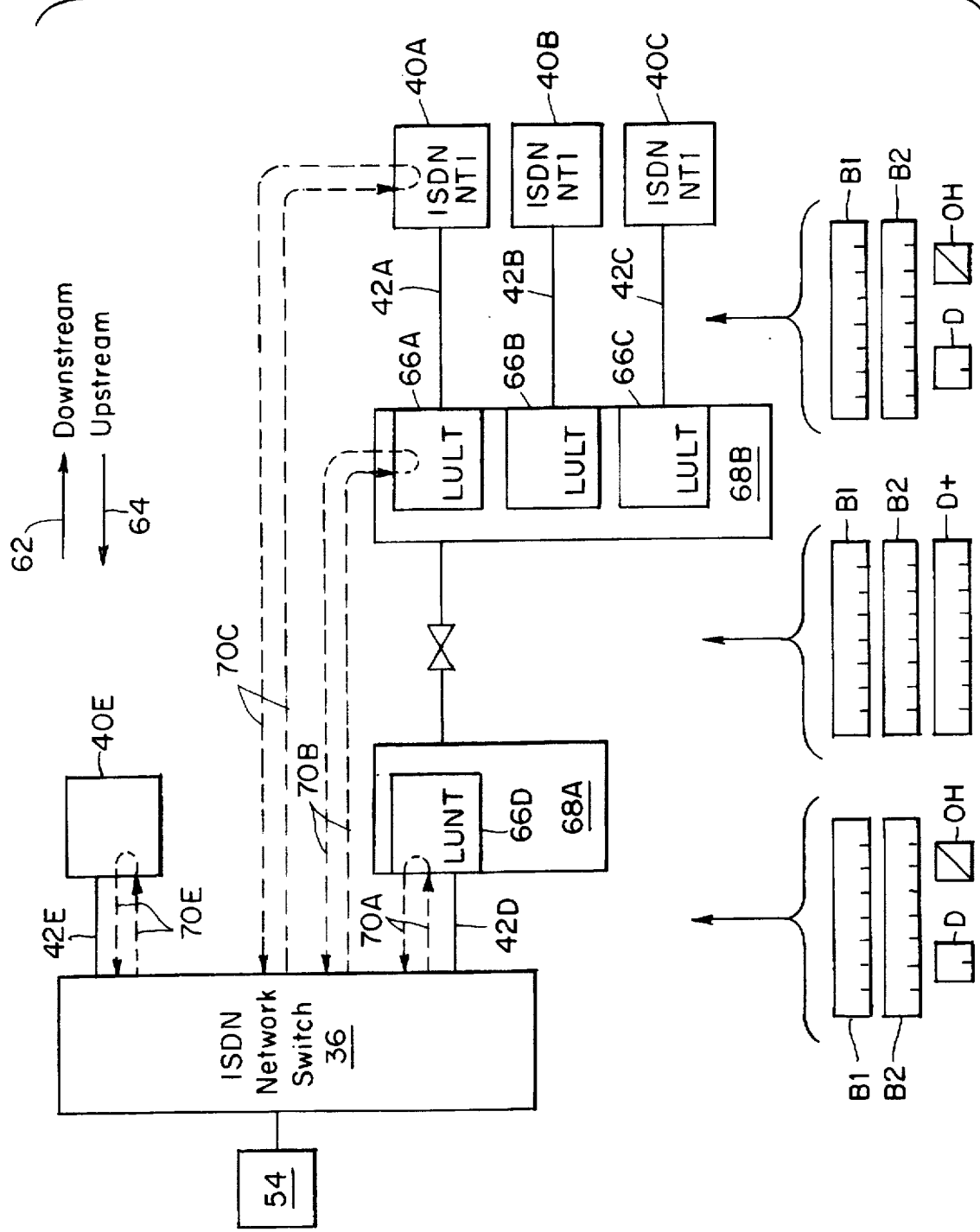
FIG. 1 is a schematic illustration of a prior art ISDN network.
Figure 2:
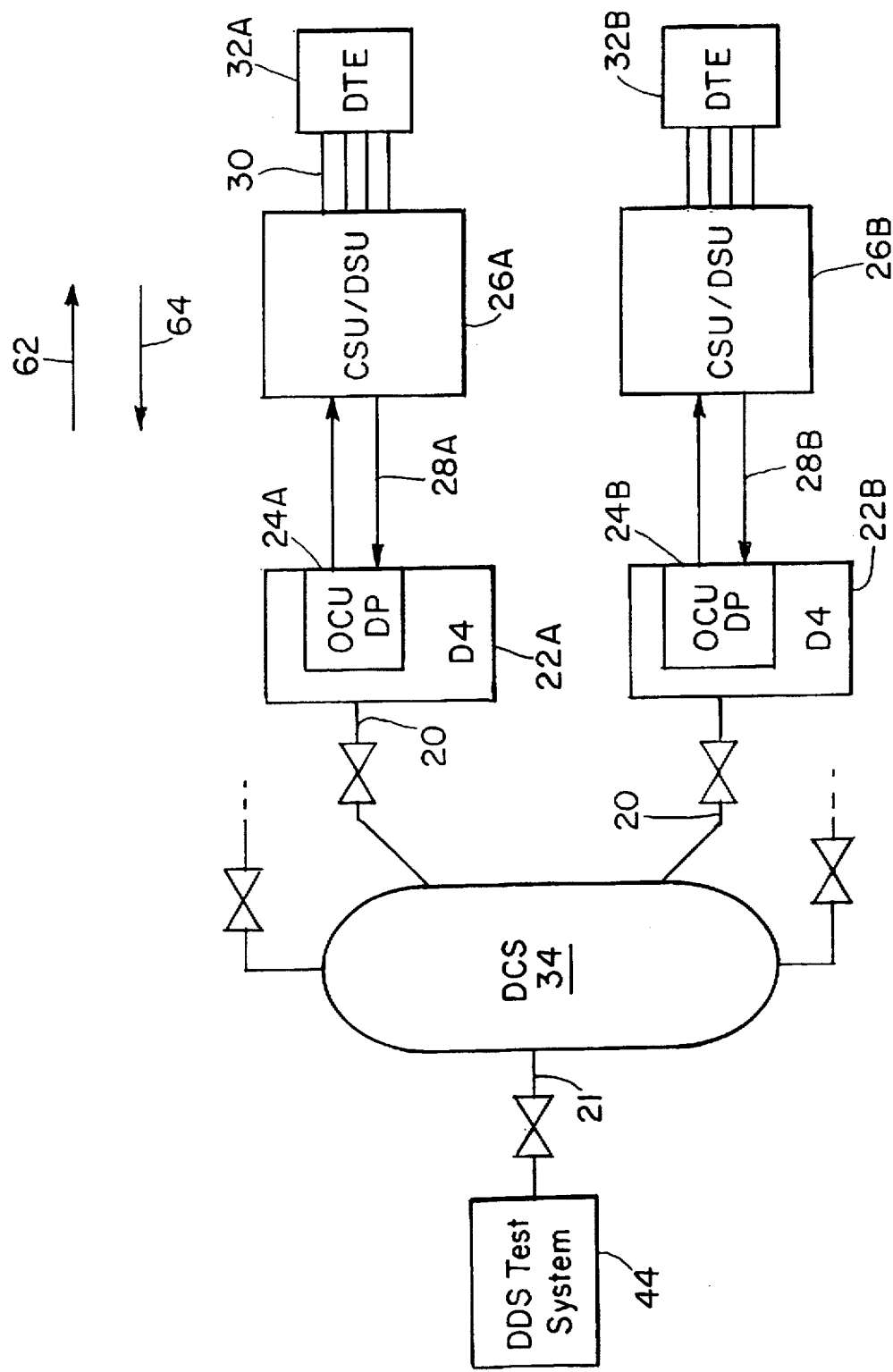
FIG. 2 s a schematic illustration of a prior art DDS network.

With reference to the configuration shown in prior art FIG. 1, assume, for example, that channel units 66D and 66B are ISDN-U units interconnected in tandem between the ISDN network switch 36 and network termination 40B at the customer site. If ISDN-U unit 66B were configured to provide ISDN D channel service to network termination 40B, then DDS testing is unavailable at unit 66B because the ISDN-U unit 66B disables the D channel during DDS testing, as described above. Even if the D channel is provisioned off at units 66D, 66B and at the customer site 40B, loopback testing initiated from the ISDN-U unit 66D furthest from the customer will not be able to loop back the customer's network terminal 40B. This is because the ISDN-U 66B converts DDS-protocol loopback commands to ISDN eoc commands, but the eoc channel is hosted on the D+ channel, which is disabled during DDS operations. Therefore, the ISDN-U does not permit DDS testing across a full-bandwidth carrier facility such as a T1 20 since the D+ channel is provisioned off. The disabled D+ channel precludes transmission units upstream from the full-bandwidth carrier 20 for example, a LUNT 66D from requesting loopbacks from any units downstream of the LULT 66B, for example the NT1 40.

The ISDN-U is intended for a specific narrow application as a replacement for a DDS end office channel unit (OCU). A result, significant restrictions are placed on test configurations. The ISDN-U replacement allows a higher grade of service between the CSU and customer premises on a single wire pair—according to ISDN protocol, rather than a lower grade of service on dual wire pairs—according to DDS protocol. In its preferred application, all channel units upstream of the ISDN-U unit are DDS protocol units. The DDS command must be transmitted in-band over the B1 or B2 channel to provide a loopback or be converted into an eoc command to loopback the downstream network termination. Because the ISDN-U unit monitors the B1 and B2 channels for DDS sequences, the possibility exists that data on either channel may emulate a DDS sequence and improperly initiate a loopback. Therefore, the ISDN-U embodiment is susceptible to false loopback.

In contrast, the present invention does not require the D channel to be disabled and is therefore consistent with all ISDN transmission modes. It therefore overcomes the above-described limitations of prior art embodiments. For this reason, DDS loopback testing can be conducted across full-bandwidth transmission facilities such as a T1 transmission line. A preferred embodiment of the invention includes circuitry for receiving DDS-protocol commands on the ISDN-protocol D+ channel in such a manner that the possibility for false loopback initiation is eliminated, overcoming the limitation of prior art devices.

The present invention is further directed to a method and apparatus comprising an ISDN protocol transmission device responsive to a DDS test command sequence. The device monitors a portion of an ISDN protocol communication channel carrying D channel data for a DDS protocol test command sequence. In response to a detected command, the ISDN device performs the requested DDS test. The DDS test command sequence may comprise a DDS loopback command (latching or non-latching), a DDS tandem loopback command, a DDS release loopback command, any of the DDS-protocol test command sequences specified in Bellcore document TA-TSY-000077, or any non-standard or proprietary test commands generated by the test operator.

In a preferred embodiment, the ISDN protocol transmission device further comprises an address circuit adapted for decoding address data from the DDS test command. If the address equals a predetermined value, for example 1, the address circuit instructs the ISDN device to process the DDS test command. If the decoded address data is not equal to the predetermined value, then the address circuit decrements the address number, and a conversion circuit converts the DDS protocol test command to an ISDN embedded operations channel (eoc) command and transmits the eoc test command over the digital communication channel to an adjacent ISDN device.

In another aspect of the invention, the DDS test command comprises a loopback command. The processing circuit responds by activating loopback mode in the ISDN device wherein digital test data received in a first direction on the communication channel is retransmitted in a second direction on the communication channel. If the ISDN device receives a test command comprising a loopback release command, the processing circuit responds by deactivating the loopback mode according to DDS protocol. The present invention supports DDS loopback tests comprising latching and non-latching tests on all of the ISDN channels including the B1 channel, B2 channel and D channel.

The present invention is further directed to a test system comprising a bidirectional digital communication channel, a network test unit, and an ISDN protocol transmission device. The digital communication channel communicates digital data in first and second directions of transmission. The network test unit is adapted to transmit digital signals in the first direction and receive digital signals in the second direction. The digital signals transmitted by the network test unit comprise DDS protocol test commands and test data. The ISDN protocol transmission device is also coupled to the communication channel. The ISDN device monitors a portion of the communication channel carrying D channel data for DDS protocol test commands received in the first direction. When a command is received, it is processed. The network test unit may be coupled to the communication channel at a digital crossconnect switch, a metallic access system or at the faceplate of the ISDN device.

In a test system employing metallic access, a network test unit gains access at the DS0 level to perform testing. Access is gained at a channel bank at the T/R and T1/R1 wire pairs, for example, at an SMAS port. An ISDN-protocol transmission device responsive to DDS protocol test commands is coupled to the digital communication channel for receiving commands issued by the network test unit. The ISDN device includes a detecting circuit for detecting whether ISDN protocol 2B1Q formatted signals are absent on the communication channel for a predetermined time period. A receiver circuit determines whether a valid DS0 formatted signal is present on the communication channel. A monitoring circuit responds to DDS protocol test commands transmitted over the communication channel from the network test unit in DS0 format. A processing circuit processes the DDS protocol test command. The test command may comprise loopback or tandem loopback commands as described above.

Test access may also be provided at the faceplate of the ISDN protocol transmission unit. In this embodiment, an ISDN protocol transmission device receptive to DDS protocol test commands is coupled to an ISDN protocol digital communication channel provisioned with D channel service. The device includes a faceplate having terminals for receiving a DDS protocol test unit. A monitoring circuit monitors the terminals for DDS protocol test commands transmitted from the test unit while the D channel portion of the digital communication channel is enabled. A processing circuit processes the test commands. In a preferred embodiment, the terminals comprise transmit and receive terminals. A channel selection switch is provided to select whether D+, B1, or B2 channel data is activated during the test. A detection circuit is provided for determining whether a receive jack is coupled to the receive terminal. The ISDN device responds to a coupled receive jack by transmitting an ISDN-protocol channel data to the receive jack, for example, the D+, B1, or B2 channels, such that the ISDN device serves as a monitor for channel data.

In another aspect of the invention, the ISDN protocol transmission device comprises circuitry for providing loopback testing across the ISDN D channel with the test being hosted at a test set transmitting test data at a rate less than the transfer rate of the D channel data. A rate adapter circuit receives iterations of DDS-protocol loopback test data transmitted at a rate less than the transfer rate of the D channel data. The DDS loopback test data is repeated for a plurality of iterations and the rate adapter circuit extracts at least one bit from a subset of iterations and inserts the at least one bit onto the D channel. A framing pattern is periodically inserted on the D channel to pad the remaining D channel bandwidth. For example, data is transmitted on a standard ISDN D channel at a rate of 16 kbps. However, standard DDS test sets are not equipped to transmit test data at 16 kbps, but rather at 9.6 kbps. This aspect of the invention therefore allows for loopback testing on the 16 kbps ISDN-protocol D channel from a test set transmitting data at 9.6 kbps or at any other rate less than 16 kbps. Rate conversion is available from all test access configurations described above.

I. ISDN Loopback Testing

Figure 3:
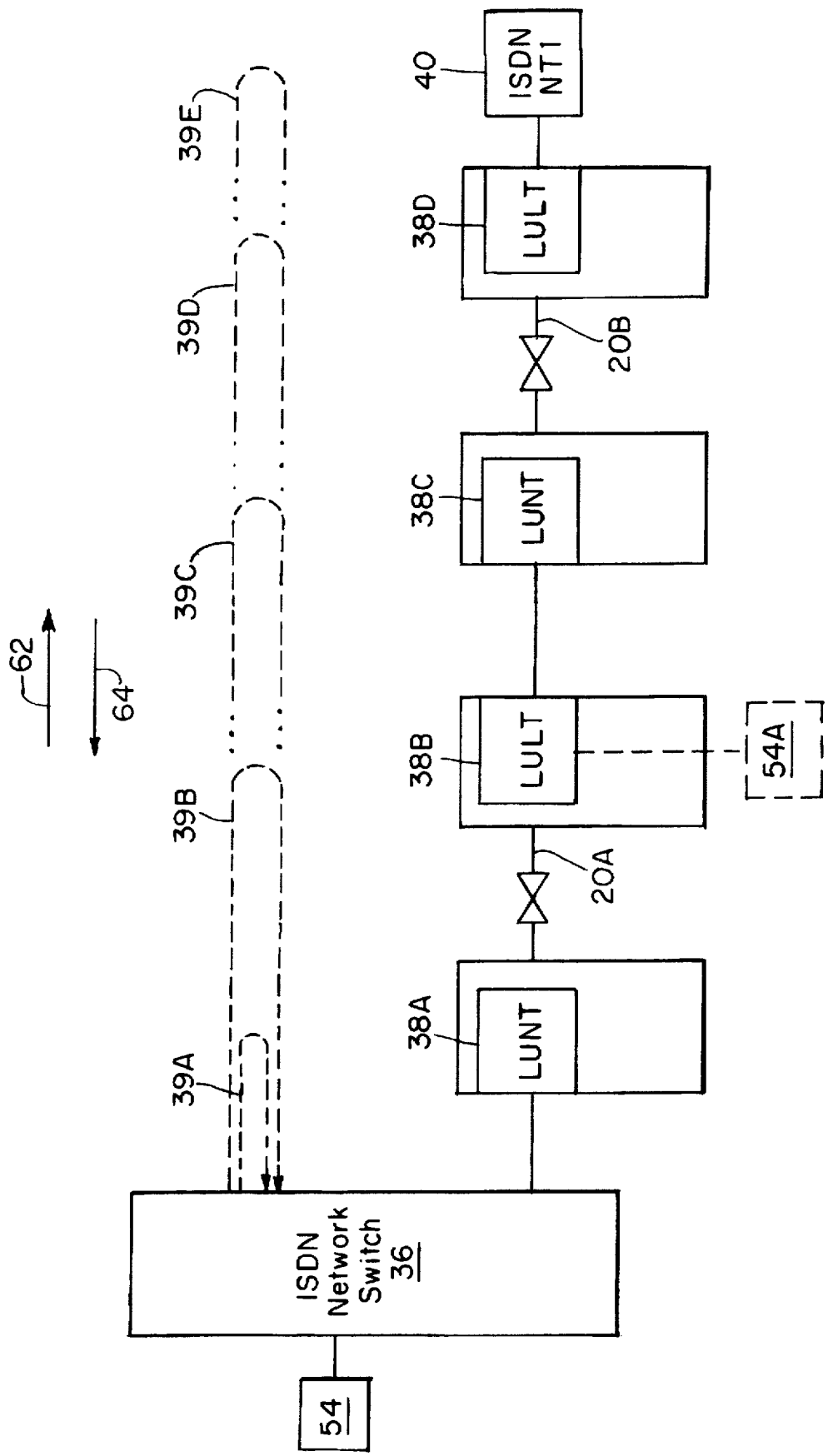
FIG. 3 is a schematic illustration of a prior art ISDN network illustrating a plurality of intermediate transmission units in tandem between the network switch and the customer premises.

FIG. 3 is a schematic illustration of a typical prior art ISDN transmission network. The network includes a plurality of ISDN transmission devices 38, in tandem along a communication path defined between an ISDN network switch 36 and an ISDN network termination 40 at a customer premises. Each ISDN transmission device 38A–D in the communication chain is capable of entering loopback mode and performing a loopback test initiated at a test console 54 on the ISDN switch 36.

In a loopback test, data is transmitted from the network switch 36 to a selected ISDN transmission device 38A–D in a downstream direction 62 and returned in an upstream direction 64 to the network switch 36. The returned data is verified by the ISDN test console 54 at the network switch 36 to determine whether transmission errors occurred along the communication path. Test paths 39A–39D correspond to loopback tests terminated at channel units 38A–38D, and test path 39E corresponds to a loopback test terminated at the customer network termination NT1 40. Each ISDN transmission device 38A–D along the communication path is assigned an address to allow the network 36 to select which device is to enter loopback mode. The address of a device 38A–D is a function of the number of intermediate devices between that particular device and the ISDN test console 54. For example, in the network shown in FIG. 3, transmission device 38C would have an address of 3 with respect to the test unit 54 at the ISDN switch 36. However, if the test unit 54A were located at the faceplate of transmission device 38B, then transmission device 38C would be accessed with an address of 2, taking into account transmission device 38B.

ISDN loopback commands are typically transmitted over a carrier 20 such as T1 on the embedded operations channel (eoc). The eoc channel is transported at a rate of 2 kbps on the Maintenance Channel Bit (bit 5) of the D+ channel. The ISDN eoc loopback commands are encoded with the type of loopback to be performed (B1, B2, or 2B+D) and the address of the device in the transmission stream to be tested. The eoc address field can range in value from 0 to 7. Address 0 is reserved for network termination unit 40 (NT1) at the customer premises and address 7 is reserved for a broadcast address. The remaining addresses 1–6 are designated for reaching intermediate devices between the ISDN switch 36 and the network termination unit NT1 40.

According to standard ISDN protocol, an ISDN transmission device 38A receiving an eoc command decodes the address field of the eoc to determine the address number of the eoc command. The transmission device 38A in turn complies with the received eoc message. A received address equal to 1 indicates that the command is intended for that particular transmission device. If the received address is 2–6, the tandem device 38A decrements the address number and retransmits the command downstream in the direction of arrow 62 to an adjacent tandem device 38B in the transmission chain. The adjacent device 38B performs the same function and the process is repeated until a device 38D receives address number 1. After the device 38D to be tested processes the eoc command, for example by entering loopback mode, it sends a confirmation message upstream in the direction of arrow 64 to the ISDN test unit 54. This is done by setting the address field in the eoc channel to 1 in the confirmation message. As this confirmation message traverses its way upstream 64 to the test origination point 52 at the network switch 36, each of the intermediate transmission devices 38A–C increments the address field by 1. In this manner, the test originator at the network switch 36 receives a confirmation message that the intended device 38D has entered loopback mode, with the address field set to the same value as that of the original loopback request.

At this point, the test operator at the ISDN test unit 54 can perform a loopback test terminated at transmission unit 38D. ISDN loopback tests can be performed on either or both of the B channels (B1, B2), or on both B channels in combination with the D channel (2B+D). A plurality of predetermined stress patterns are transmitted downstream 62 over the various channels, looped back at the selected loopback point 72 at the transmission unit 38D and retransmitted upstream 64 back through the intermediate units 38A–38C to the ISDN test unit 54, where the data is validated. If any errors occurred, the test operator can remove the current loopback unit from loopback mode and initiate a loopback at an adjacent upstream unit 38C along path 39C, followed by a loopback test at unit 38B along path 39B, and unit 38A along path 39A. In this manner, an operator at the ISDN test unit 54 can isolate the location along the communication path where communication errors occur.

II. Enhanced ISDN-DP Transmission Unit—DCS Test Access

Figure 4:
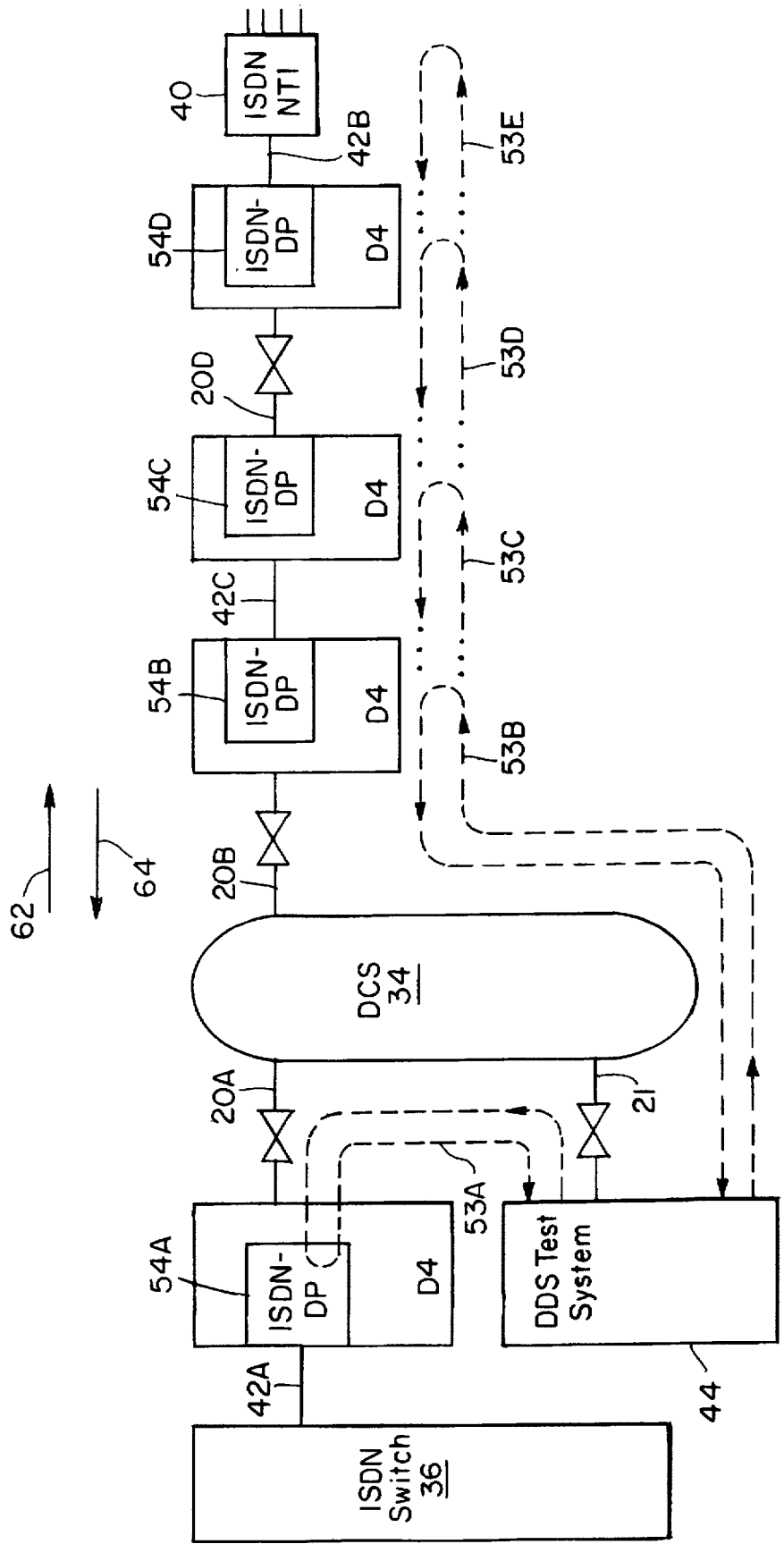
FIG. 4 is a schematic illustration of DDS testing of an ISDN network with test access through a digital crossconnect switch in accordance with the present invention.

FIG. 4 illustrates a typical ISDN network configuration employing enhanced ISDN transmission units of the present invention. Note that for purposes of clarity, the enhanced ISDN transmission unit of the present invention is hereinafter referred to as an "ISDN-DP" transmission unit. While the functionality of the ISDN-DP is described in detail with DCS access testing, similar functionality is available with Metallic and Faceplate access testing described below.

In the system embodiment of FIG. 4, test access is gained through a Digital Crossconnect Switch (DCS) 34 on a T1 network 20 in an upstream 64 or downstream 62 direction. Two intermediate ISDN-DP devices 54A,54B are positioned on either side of the DCS 34 in the communication path between the ISDN network switch 36 and the customer network terminal 40. A first intermediate ISDN-DP device 54A has its two-wire loop 42A side facing toward the ISDN network switch 36, and is therefore referred to as a Line Unit Network Termination (LUNT). A second intermediate ISDN-DP device 54D has its two-wire loop 42B side facing toward the customer NT1 40, and is therefore referred to as a Line Unit Line Termination (LULT). It is important to note that the test access can be gained from the DCS 34 in both upstream 64 and downstream directions, toward the LUNT 54A or the LULT 54D. This is in contrast with traditional prior art ISDN channel unit testing wherein upstream testing is unavailable as testing can only be initiated in the downstream 62 direction from network 36 to customer 40.

In addition to being fully compatible with and responsive to ISDN protocol loopback testing commands received over the embedded operations channel (eoc), the present invention ISDN-DP is responsive to DDS protocol test commands received on the T1 line 20. This allows loopback testing to be initiated at any available location upstream from the ISDN-DP unit 54B, including a standard DDS test unit 44 coupled to the test trunk 21 of the DCS 34. The ISDN-DP device of the present invention monitors the T1 carrier 20B for DDS protocol test commands. Upon detection of a DDS command, the ISDN-DP determines whether the command was intended for it, or for a tandem downstream or upstream device. If the DDS command is intended for it, the ISDN-DP device processes the command and transmits verification to the test source 44, according to DDS protocol. If the DDS command is intended for a tandem unit, the ISDN-DP device converts the tandem command to an ISDN protocol command on the eoc channel and transmits the command to an adjacent transmission unit 54C,54D in the communication path. In addition, the ISDN-DP 54B device detects DDS CSU/DSU latching loopback commands and responds by generating a standard ISDN eoc NT1 loopback command, as the NT1 40 in the ISDN network is analogous to the CSU/DSU in the DDS network.

This allows a DDS test operator at a DCS 34 to test the ISDN-DP device 54B along path 53B, and all downstream ISDN units 54C,54D along paths 53C,53D including the NT1 40 along path 53E, with a DDS test system 44 coupled to an upstream DCS 34 even though the ISDN units downstream of the ISDN-DP 54B may be standard prior art ISDN products incapable of processing DDS commands. This requires the ISDN-DP device 54B to operate as a test conversion device and do the conversion from DDS loopback commands to traditional ISDN BRI eoc loopback commands and pass the commands downstream to adjacent ISDN devices in the communication path. In addition, the ISDN-DP operating as a test conversion device supplies the test operator with proper feedback according to DDS protocol during various phases of the test.

The ISDN-DP of the present invention is further capable of performing upstream loopback tests, in contrast with prior art ISDN transmission units. For example, if the DDS test system 44 transmits a DDS loopback command to ISDN-DP 54A over carrier 20A, the unit 54A will respond by entering loopback mode as described above. ISDN-DP units in tandem upstream from ISDN-DP unit 54A can likewise be instructed to enter loopback mode, with ISDN-DP unit 54A operating as a test conversion unit to receive DDS protocol test commands from the DDS test system 44, and convert the commands into eoc commands, for example by using the reserved eoc code space, and pass the eoc commands upstream to tandem ISDN-DP units. For this embodiment, the upstream units would have to be homogeneous tandem ISDN-DP units, because prior art ISDN channel units are incapable of supporting upstream loopback testing.

In normal operation, an ISDN transmission device receives and transmits data on the D+ channel over the T1 carrier 20B according to the Bellcore TR-NWT-000397 protocol. The D+ channel format is illustrated below in Table I.

TABLE I

| | D+ Channel Format |
|---|---|
| Bit Number | Description |
| 1 | Spare bit (set to "1" when not used) |
| 2 | DS1 Yellow Alarm bit (set to "1" except for alarm |
| 3 | Zero Byte Indicator for B1 time slot ("1" for B1=0) |
| 4 | Zero Byte Indicator for B2 time slot ("1" |

TABLE I-continued

D+ Channel Format

| Bit Number | Description |
|---|---|
| | for B2=0) |
| 5 | Maintenance (DSL Overhead) Channel bit |
| 6 | D Channel, 1st bit |
| 7 | D Channel, 2nd bit |
| 8 | 1's Density Requirement bit (set to "1") |

As Table I illustrates, the D+ channel has specific format characteristics which uniquely identify a valid D+ channel signal. The characteristics of the D+ format preclude the reception of a DDS latching loopback sequence over the ISDN D+ channel during normal operation since the ISDN D+ channel specifies bit 8 to be a "1" while the DDS latching loopback sequence codes (TIP, LBE and FEV—see Table II below) are all characterized with bit 8 equal to a "0". Above and beyond that, the latching loopback sequence will fail to satisfy the cyclic redundancy check (CRC) embedded into the D+ maintenance channel bit (bit 5). Therefore, normal traffic on the D+ channel will not accidentally emulate any of the DDS latching loopback sequence codes. It follows that false loopback initiation can not occur on the D+ channel.

The same can not be said of the B1 and B2 channels. It is possible, with a low probability, that customer data on these channels could emulate a DDS latching loopback sequence. This possibility may arise in a network employing prior art ISDN-U units, which monitor the B1 and B2 channels for DDS commands, as described above. Therefore, in a preferred embodiment, the ISDN-DP device of the present invention is configured for D+ channel DDS loopback detection transmission, with B1 and B2 channel DDS loopback detection being optional for the user.

There are a variety of choices available for the loopback select code specified for the ISDN-DP devices. The ISDN-DP devices of the present invention are analogous in operation to DS0-DP devices on traditional DDS network architectures. Therefore, the loopback select code for DS0 data ports is a good choice even though others are possible. For example, the OCU loopback select code could also be used. In response to detection of a DS0-DP latching loopback sequence, the ISDN-DP device of the present invention performs an ISDN protocol 2B+D loopback. If the ISDN-DP device receives a DDS protocol tandem unit DS0-DP latching loopback sequence, the ISDN-DP device converts the DDS command into an ISDN eoc command and transmits the eoc command to an adjacent tandem unit. The conversion process is described below. In addition, if the ISDN-DP device detects a CSU or DSU latching loopback, the command is converted into a traditional ISDN eoc NT1 loopback command. The latching loopback sequences which the ISDN-DP device of the present invention responds to are defined in Bellcore document TA-TSY-000077, the control codes for which are referenced below in Table II.

TABLE II

DDS COMMANDS

| DDS Control Code | Binary Encoding |
|---|---|
| TIP | s0111010 (s = 0 or 1) |
| LSC | s0000101 |
| LBE | s1010110 |

TABLE II-continued

DDS COMMANDS

| DDS Control Code | Binary Encoding |
|---|---|
| All Ones | s1111111 |
| FEV | s1011010 |

In a preferred embodiment, the ISDN-DP of the present invention executes a latching loopback upon receipt of a fortieth far end voice byte (FEV). For a successful loopback, an ISDN-DP device accessed by the test system echoes the FEV bytes back on a one-for-one basis after the loopback is established, to imitate the operation of DDS transmission devices. In addition, the ISDN-DP device performs loopback enable (LBE) mapping according to DDS protocol to imitate DDS channel units. The ISDN-DP is required to map only after entering loopback. Since LBE bytes are not passed downstream, there is no need to map before entering loopback.

LBE mapping is initiated after the latching loopback sequence has successfully been executed. The network test system 44 typically follows the FEV sequence with LBEs as further confirmation of the loopback activation. The ISDN-DP device 54B directly accessed by the test system 44 is responsible for performing the LBE mapping. While in loopback mode and after receipt of 30 consecutive LBEs, the ISDN-DP device 54B directly adjacent the test system 44 returns a MAP code, S0010011 or S1101101 (where S=0 or 1), to the test system on a one-for-one basis with received LBEs. If six consecutive non-LBE bytes are detected by the ISDN-DP device, the ISDN-DP exits the mapping state and must detect 30 consecutive LBEs to begin mapping again.

The latching loopback is released via the same method as used by conventional DDS dataports. Receipt of at least 35 consecutive transition in progress TIP bytes causes the latching loopback to be released. The TIP codes can be transmitted on any of the channels (i.e., D+, B1 or B2) once a loopback is initiated. Also, an ISDN eoc message of Return-to-Normal could be used release the loopback as well (specified in TR-TSY-000829, page 11.3-37). ISDN eoc messages are given below in Table III.

TABLE III

ISDN ecc COMMANDS

| Message | Encoding |
|---|---|
| OPERATE 2B+D LOOPBACK | 01010000 |
| OPERATE B₁ LOOPBACK | 01010001 |
| OPERATE B₂ LOOPBACK | 01010010 |
| REQUEST CORRUPTED crc | 01010011 |
| NOTIFY OF CORRUPTED crc | 01010100 |
| RETURN TO NORMAL | 11111111 |
| HOLD STATE | 00000000 |
| UNABLE TO COMPLY | 10101010 |
| START HOURLY PM INTERVAL | 01110100 |
| START DAILY PM INTERVAL | 01110101 |
| RESET PM REGISTERS TO ZERO | 01110110 |

An ISDN-DP device in LULT mode, for example ISDN-DP 54B serving the customer site NT1 unit, is responsible for monitoring the D+ channel for the latching loopback sequence. As mentioned earlier, the sequence may comprise the tandem unit latching loopback sequence. A tandem sequence indicates a request for a loopback of a downstream unit, for example, ISDN-DP 54C, or 54D. The ISDN BRI device responds to the detected tandem unit latching loopback sequence by generating the appropriate ISDN BRI eoc message, and transmitting it downstream toward the customer.

Specifically, if the sequence contains the DDS DS0-DP loopback select code (LSC) byte and is directed to the ISDN-DP device itself, then the ISDN-DP 54B performs a 2B+D loopback and processes the far end (FEV) and loopback enable (LBE) bytes as described above. The DDS test unit 44 in response initiates a loopback test along path 53B. Note that the loopback tests performed could be of various types, for example B1 or B2 loopbacks but 2B+D is preferred since it covers all the available ISDN BRI bandwidth.

If the incoming latching loopback sequence contains the DS0-DP loopback select code (LSC) byte and is a tandem latching loopback sequence, then the ISDN-DP device determines which address in the communication path to send a 2B+D loopback request. This is determined by detecting the number of iterations of sequential All-ones bytes and loopback enable LBE bytes received. If there is a single iteration of this pattern, then the ISDN-DP device issues a 2B+D loopback to address one, or the next downstream channel unit, by populating the eoc channel with an address of one and a command to enter loopback mode. This instructs an adjacent downstream ISDN channel unit 54C to enter a 2B+D loopback along path 53C. If two iterations are received, an eoc message is generated to instruct ISDN-DP unit 54D to enter loopback mode, and a loopback test can be initiated along path 53D.

An ISDN-DP device receiving the DDS latching loopback sequence is responsible for verifying that the downstream loopback request was processed and executed. For purposes of the present invention, an ISDN-DP device operating in this mode is referred to herein as the "test conversion device". The ISDN-DP test conversion device 54B monitors upstream 64 eoc messages received from the downstream 62 ISDN-DP device 54C for verification of whether the proper eoc loopback confirmation message has been returned. This is done according to the procedures defined in Bellcore TR-NWT-00397 and TR-TSY-000829. Only after receiving the confirmation message from the downstream ISDN device 54C does the ISDN-DP test conversion device 54B transmit far end voice (FEV) bytes upstream 64 according to DDS protocol on a one-for-one basis to the test system 44 followed by Loopback Enable (LBE) mapping. This handshaking mechanism ensures that the ISDN-DP test conversion device 54B does not falsely report successful loopback activation to the DDS test system. Note as an option, that the MAP code, MAP0 or MAP1, returned to the test system is dependent on the number of tandem unit iterations that are in the loopback request. If the number is odd (1, 3, 5, etc.) then MAP1 is returned. If the number is even (0, 2, 4, etc.) then MAP0 is returned. This provides the benefit of an alternating MAP0/MAP1 sequence as the tandem units are tested.

An ISDN-DP device 54B adjacent the network test system 44 could also receive a request to loopback the customer's network termination device NT1. This is analogous to a CSU/DSU loopback test in DDS protocol. To accommodate this, the ISDN-DP device is capable of detecting CSU and DSU latching loopback sequences initiated by the DDS test system. In this case different loopback select code (LSC) bytes are used. The CSU LSC code is S0110001 and the DSU LSC code is S1110111, where S=0 or 1. If the ISDN-DP device 54B detects a CSU or DSU latching loopback sequence on the D+ channel according to DDS protocol, then it issues an ISDN 2B+D loopback request to the NT1 40. The ISDN-DP channel unit 54B is responsible for detecting that a valid loopback confirmation is received back from the NT1 via the ISDN eoc channel. Only after receiving the confirmation from the NT1 40 does the ISDN-DP device 54B transmit far end voice (FEV) bytes upstream on a one-for-one basis and then perform LBE mapping to confirm loopback activation to the DDS test set 44. This handshaking mechanism ensures that the ISDN-DP device does not falsely report successful CSU or DSU latching loopback activation to the DDS test system.

As an additional test capability, a preferred embodiment of the ISDN-DP device of the present invention supports loopback testing across the ISDN D channel. Although some D channel test capability was available in prior art ISDN transmission units with tests hosted at the ISDN switch, the ISDN-DP device of the present invention is the first to allow loopback testing on the D channel with the test being initiated at the DCS test trunk, at a metallic access point, or at the face plate of transmission unit (metallic and faceplate test access is described below) and the first to allow test data patterns to be transmitted from a DDS test set.

The D channel comprises 2 bits (bits 6 and 7) of the D+ channel as described above. Since the D+ channel of the carrier facility 20 is not fully passed across the digital subscriber line (DSL), D channel testing can not be performed at the 64 kbps rate. However, the two D channel bit positions (bit 6 and 7 of the D+ channel) are passed across the DSL. This reduces the total D channel test bandwidth available to 16 kbps. Since no DDS network test system is capable of 16 kbps test bandwidth, the next logical choice is 9.6 kbps, as this is the highest rate which is less than the 16 kbps maximum and is a rate which is popular in DDS test systems. To accomplish this, six data bits are extracted from the 9.6 kbps five byte repeated DS0 pattern and inserted into the D channel bit position as shown below in Table IV. The data byte generated by the DDS test unit includes 6 test bits in positions 2-7 bounded by "1", bits in positions 1 and 8. The test pattern is repeated for five iterations. During the first three iterations for 9.6 kbps operation, two bits are captured and formatted into the 2-bit D channel on the D+ channel. For the remaining two iterations, a framing pattern, for example, 0110, is inserted into the D channel bit positions. The framing pattern pads out the remainder of the 16 kbps bandwidth. Using this mapping and creating a valid D+ signal allows the DDS test center to perform loopback testing of the D channel on an ISDN network.

TABLE IV

D CHANNEL LOOPBACK TESTING AT 9.6 KBPS

| 9.6 Test Pattern | D+ Channel Bits 6 and 7 |
|---|---|
| $1B_1B_2B_3B_4B_5B_61$ | $B_1B_2$ |
| $1B_1B_2B_3B_4B_5B_61$ | $B_3B_4$ |
| $1B_1B_2B_3B_4B_5B_61$ | $B_5B_6$ |
| $1B_1B_2B_3B_4B_5B_61$ | 01 |
| $1B_1B_2B_3B_4B_5B_61$ | 10 |
| $1B_7B_8B_9B_{10}B_{11}B_{12}1$ | $B_7B_8$ |
| $1B_7B_8B_9B_{10}B_{11}B_{12}1$ | $B_9B_{10}$ |
| $1B_7B_8B_9B_{10}B_{11}B_{12}1$ | $B_{11}B_{12}$ |
| $1B_7B_8B_9B_{10}B_{11}B_{12}1$ | 01 |
| $1B_7B_8B_9B_{10}B_{11}B_{12}1$ | 10 |

An ISDN-DP device operating as a test conversion device supporting 9.6 kbps D channel testing, responds to receipt of a six bit test pattern on the D channel in an upstream direction by formatting the six bits from the D channel bits into a valid 9.6 kbps DDS format in the D+ channel return path so that the DDS test center receives a properly formatted 9.6 kbps pattern. This process is the reverse of the process described above.

After a 2B+D loopback is initiated, the DDS test center 44 can then access either of the two ISDN B channels or the D+ channel and transmit any desired stress pattern. The ISDN channels are available for test purposes until the DDS test center transmits a test termination command comprising for example a required number of transition in progress TIP codes on the D+ channel or either of the B-channels.

Figure 5:
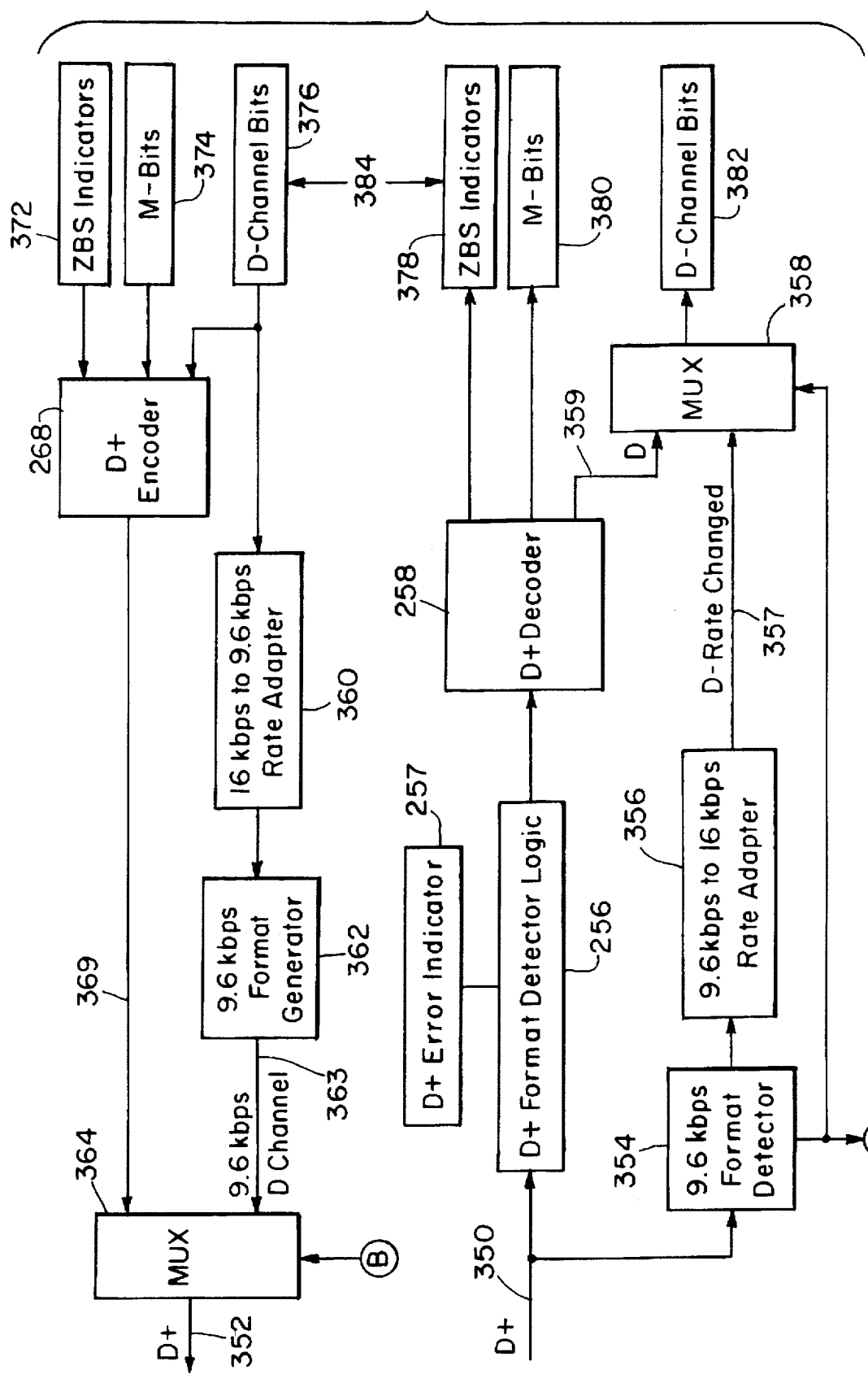
FIG. 5 is a schematic block diagram of ISDN-DP circuitry for accommodating DDS protocol 9.6 kbps D channel loopback testing in accordance with the present invention.

FIG. 5 is a schematic block diagram of circuitry for supporting loopback testing across the ISDN D channel at 9.6 kbps rate as described above. D+ channel bits are received from a multiplexed bit stream 350, for example a T1. D+ format detector logic 256 determines whether the D+ byte is in proper format. If not, the D+ error indicator 257 is activated. If the D+ byte is in proper format, D+ decoder logic 258 decodes the D+ channel into ZBS indicator bits 376, M bits 380, and D channel bits 382 for further transmission onto the DSL. This is described in further detail below in conjunction with FIG. 7.

In parallel with the D+ format detector logic 256, the D+ channel 350 is also input into a 9.6 kbps format detector circuit 354. The format detector circuit 354 determines if 9.6 kbps test data is being received in DDS protocol on the D+ channel. If so, the 9.6 kbps format detector signals two multiplexer circuits 358, 364 that a DDS protocol 9.6 kbps test is active. The 9.6 kbps signal is reformatted to 16 kbps at a rate adapter 356 according to the process described above. If the multiplexer 358 is activated by the format detector 354, the rate-changed D channel data 357 passes through the multiplexer 358 to the DSL 384. Otherwise, the decoded D bits 359 are passed through to the DSL.

In the reverse direction, the ZBS indicator bits 372, M bits 374, and D channel bits 376 are encoded into D+ channel format at a D+ encoder 268 which populates the D+channel byte 369 for transmission onto the multiplexed bit stream 352 during standard ISDN transmission. In parallel with the D+ encoder 268, the D channel bits 376 are input into a 16 kbps to 9.6 kbps rate adapter circuit 360 and further into a 9.6 kbps format generator 362 according to the process described above. If multiplexer 364 is activated by the format detector 354, then the 9.6 kbps D channel signal 363 is transmitted onto the D+ channel 352 on the multiplexed bit stream. Otherwise, the standard ISDN protocol encoded D+ channel 369 is transmitted.

Note that 9.6 kbps loopback testing on the D channel does not require that the command for initiating the loopback test be a DDS-protocol loopback command. An ISDN-protocol command could be used to initiate loopback testing, with loopback data being issued over the channel under test in the format described above.

Figure 6:
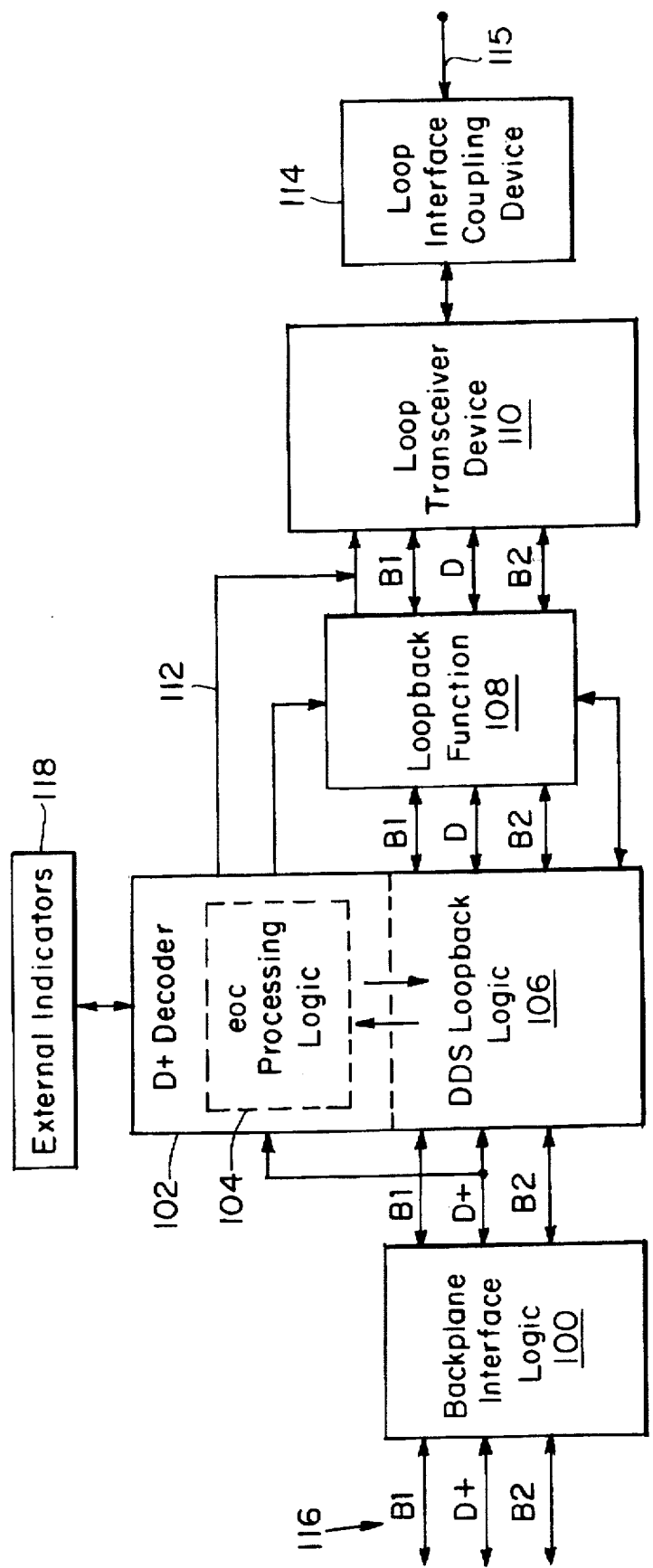
FIG. 6 is a block diagram of an ISDN-DP channel unit capable of decoding DDS test commands embedded on the ISDN D+ channel transmitted over a network in accordance with the present invention.

FIG. 6 is a block diagram of a preferred ISDN-DP device of the present invention. In a typical configuration, the ISDN-DP extracts the B1, D+ and B2 channels from the multiplexed bit stream of the T1 116 using backplane interface logic 100. After recovering the backplane signals, the ISDN-DP device examines the D+ channel for proper format and proper framing pattern at the D+ channel decoder 102. The eoc message received on the maintenance bit of the D+ channel is decoded and processed in the eoc processing logic 104. In addition, the D+ channel is forwarded to DDS loopback logic 106. The DDS loopback logic 106 examines the incoming D+ channel for the DDS loopback requests: a latching loopback request; a tandem unit latching loopback request; a CSU latching loopback request; a DSU latching loopback request.

If the DDS loopback logic 106 detects a DS0-DP latching loopback request (no tandem units) on the D+ channel, it activates loopback function logic 108 to perform a 2B+D loopback. If the DDS loopback logic 106 detects a DS0-DP tandem unit latching loopback request on the D+ channel, then the eoc processing logic 104 is commanded to issue a traditional eoc-based 2B+D loopback. The channel unit address in the eoc command is set equal to the number of All-ones LBE sequences received in the DS0-DP tandem unit latching loopback request. If the DDS loopback logic 106 receives a CSU/DSU latching loopback request, then the eoc processing logic 104 issues an NT1 loopback request. In each case, upon a successful loopback initiation, the DDS loopback logic 106 transmits the loopback confirmation upstream on the D+ channel to the test unit.

The DDS loopback logic 106 further monitors the B1, D+ and B2 channels for the DDS latching loopback release code. In practice, this code comprises a plurality of transition-in-progress bytes. If this code is detected on any of these channels, loopback mode on the ISDN BRI device is released and the eoc logic 104 transmits the eoc loopback release message of Return-to-Normal to release downstream loopbacks. From here, the signals are passed on to a loop interface coupler 114 which transmits the signals onto the DSL or two-wire pair 115.

At the input to the loop transceiver device 110, the B1, D and B2 channels are provided. Note that the D+ channel does not get passed to the loop interface in its entirety. The residual part of the D+ channel, the D channel signaling bits and the overhead bits 112, are passed to the transceiver 110. The overhead bits 112 include the eoc channel commands and responses. The ISDN-DP device inserts the downstream loopback requests at that point.

Figure 7:
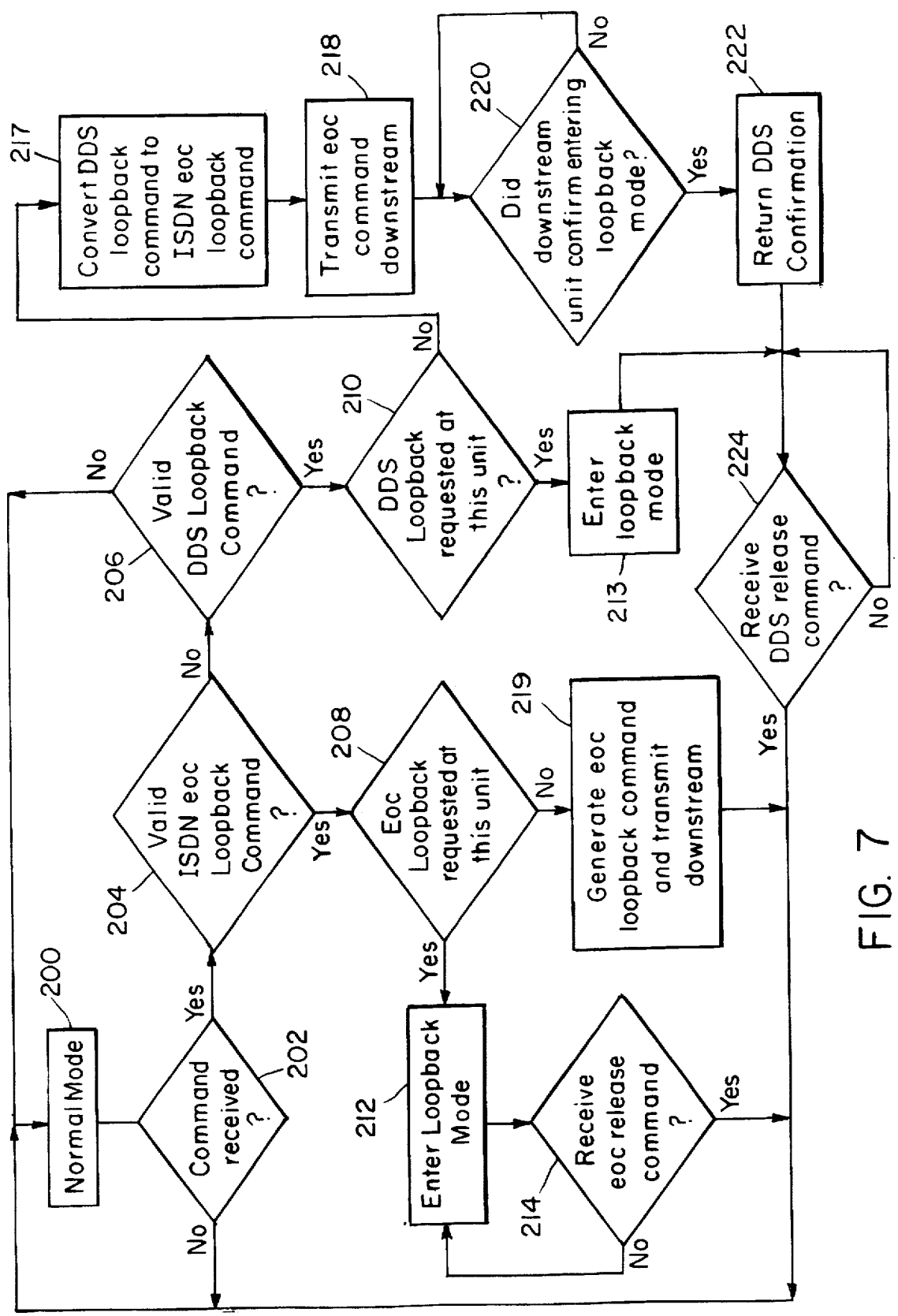
FIG. 7 is a flow diagram representing the decoding and processing of DDS-protocol loopback commands at an ISDN channel unit in accordance with the present invention.

FIG. 7 is a flow diagram of the operation of the ISDN-DP unit of the present invention. In particular, FIG. 7 represents the processing of loopback commands, whether in ISDN eoc format or in DDS format. While in normal mode 200, the ISDN-DP unit is operating as an ISDN transceiver capable of transmitting data as a LULT or LUNT according to ISDN protocol. If the ISDN-DP senses that a command has been received 202, it determines whether the command is a valid ISDN eoc loopback command 204 or a valid DDS loopback command 206. If the command is a valid ISDN eoc loopback command requested at this ISDN-DP unit 208, then the unit enters loopback mode 212 where it remains until an ISDN eoc release command 214 is issued. If the command was an ISDN eoc loopback command 204 not requested at this ISDN-DP unit 208, then an appropriate ISDN eoc loopback command is regenerated and transmitted downstream 219. After receiving a release command 214 or after transmitting the eoc command downstream 218 to a tandem unit, the ISDN-DP re-enters normal mode 200, waiting to process further commands or data.

If the received command was a valid DDS loopback command 206 requested at this unit, then the ISDN-DP enters loopback mode 213, where it remains until a DDS loopback release command 224 is received. If the command was a DDS loopback command 206 not requested at this ISDN-DP unit 210, then the DDS loopback command is first converted to an ISDN eoc loopback command 217 which, after conversion, is transmitted downstream to the next tandem ISDN-DP unit 218. After transmitting the ISDN eoc loopback command downstream 218, the ISDN-DP device waits for an indication from the downstream unit that it successfully entered loopback mode 220. If so, the ISDN-DP unit returns a DDS confirmation sequence upstream 222 and waits to receive an ISDN or DDS release command 224, whereupon the ISDN-DP unit reenters normal operation mode 200. Note that although the above description applies to downstream loopback tests, the ISDN-DP unit of the present invention is equally applicable to upstream loopback tests.

Figure 8:
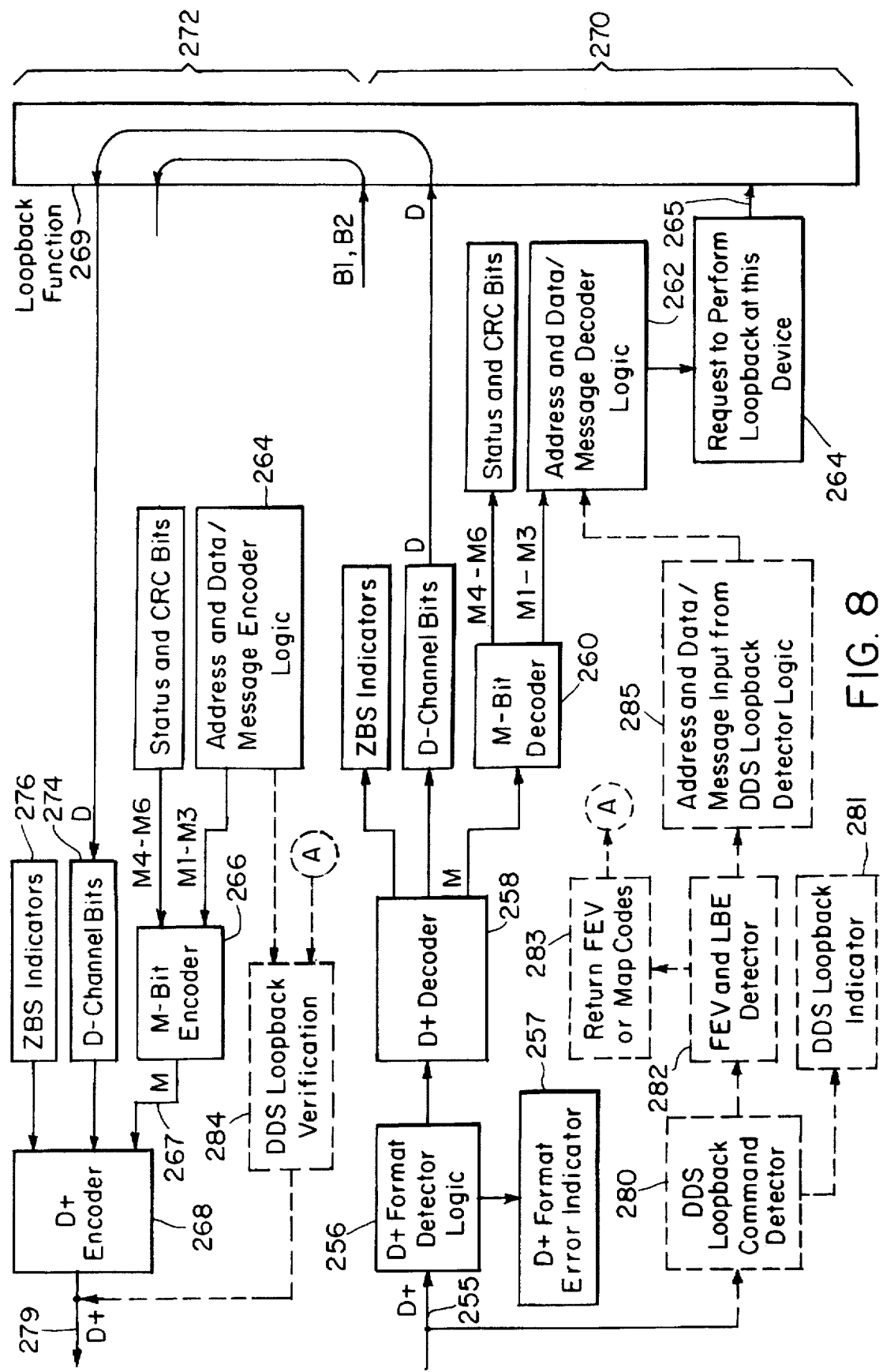
FIG. 8 is a block diagram of the logic for decoding, processing, and re-encoding the D+ channel for DDS loopback commands for an ISDN-DP in accordance with the present invention.

FIG. 8 is a block diagram of a preferred enhanced ISDN-DP transmission unit for decoding, processing, and re-encoding the D+ channel. The enhanced features of the present invention are illustrated in as dashed lines and are described below, following a description of prior art circuitry. The D+ channel 255 is received from the carrier, for example the T1, and input into D+ channel format detector logic 256 which determines whether the format of the D+ data received is in accordance with ISDN protocol. If the format is erroneous, then a D+ format error indicator 257 is enabled. If the D+ channel is in proper format, the data is passed to a decoder 258 which strips the zero-byte indicators (bits 3,4), the D channel (bits 6,7) and the maintenance bit (bit 5). See Table I above for the D+ channel format. The maintenance or M bits from successive D+ bytes are stored and decoded 260 according to standard ISDN protocol. When a standard 2B1Q superframe has been received, the decoder 260 partitions the M4–M6 status and cyclic redundancy check bits (CRC) from the M1–M3 embedded operations channel (eoc address and data/message bits). The M1–M3 bits are decoded at decoder 262 and processed according to the command transmitted in the eoc channel. For example, if the embedded eoc command requests a loopback at the ISDN channel unit, on the standard data channels B1,B2, then the ISDN channel unit will enter loopback mode. If the command requests a loopback at this device 264, a signal 265 is sent to the loopback function 269 to activate loopback mode.

The ISDN transmission units also include encoder logic 272 which populates the data into proper D+ channel format. Address and data/message encoder logic 264 encodes the M1–M3 bytes, the eoc address, and data/message bytes, which in turn are combined with the M4–M6 and CRC bytes at an M-byte encoder 266. The M-bytes 267 are combined with the D channel bits 274 and the ZBS indicators 276 at a D+ encoder 268. The 2B1Q superframe is transmitted onto the T1 carrier 269 on the D+ channel according to standard ISDN protocol.

In addition, the ISDN-DP unit of the present invention includes circuitry for detecting DDS loopback commands on the D+ channel 255, circuitry for processing the DDS loopback commands, circuitry for enabling a loopback on the D channel, and circuitry for transmitting a DDS verification command upstream to the DDS test module. A DDS loopback command detector 280 monitors the D+ channel 255 for DDS loopback commands. When a valid DDS loopback command is received, a DDS loopback indicator 281 is activated and a far end voice and loopback enable detector 282 monitors the received DDS command for appropriate signals and in response, instructs the DDS loopback verification circuit 284 to return appropriate far end voice or map codes to the test unit 283. DDS loopback detector logic 285 decodes the address and data/message from the DDS loopback command. This in turn is passed to the standard address and data/message decoder logic 262 which determines whether the request is to perform a loopback at this device 264. If so, loopback mode is enabled 265 for the appropriate B1, B2, or D channel.

In the opposite direction, the enhanced ISDN-DP unit of the present invention includes a DDS loopback verification circuit 284, which determines whether a downstream unit has indicated that it properly entered loopback mode by decoding the address and data/message codes transmitted upstream from the downstream unit. The loopback verification circuit 284 in turn transmits a valid DDS command upstream on the D+ channel 269 to the DDS test unit to verify that this ISDN-DP transmission unit or a downstream unit, has properly entered loopback mode and is ready for a loopback test.

II. Metallic Test Access

Figure 9:
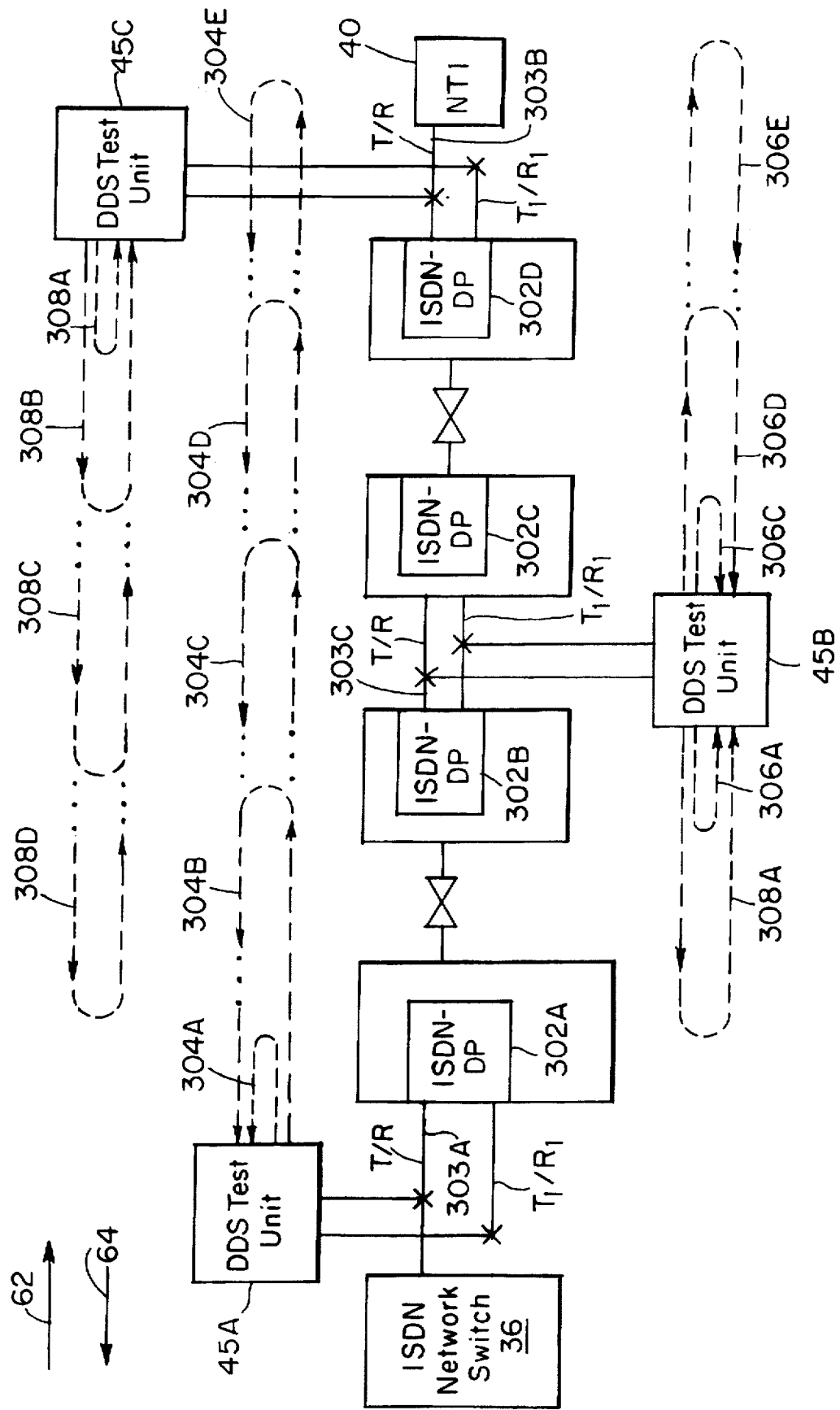
FIG. 9 is a schematic illustration of an ISDN network with DDS test access at various metallic DS0 locations on the network in accordance with the present invention.

Metallic test access is also available for the present invention, as shown in FIG. 9. In some cases, ISDN channels are not configured for multiplexed bit stream test access, for example from a DCS, because of the costs associated with terminating three DS0s in that arrangement. In these cases, test access can be provided using metallic access. The principle behind metallic test access is that a remote test unit 45A–C (RTU) using a metallic access system, for example an SMAS, can gain access at the DS0 level to perform testing. Metallic access is intrusive since it physically couples the wire pairs for the device under test to the RTU. Today many installations in telephone company central offices provide channel banks with integrated metallic access systems. As such, it is a commonly encountered access method for DDS channel testing.

An important feature of the enhanced ISDN-DP device of the present invention is its ability to allow DDS testing of an ISDN device from a metallic access point. This feature is unavailable in prior art ISDN transmission devices. As shown in FIG. 9, many channel banks today are equipped with metallic access connections to the T/R and T1/R1 wire pairs. The DS0 test access is structured so that the RTU transmits to the device on the T/R pair and receives from the device on the T1/R1 pair. The ISDN-DP device uses the T/R pair for the two wire transmission. Therefore the ISDN-DP device must share the T/R pair as the data transmission loop and as the DS0 metallic access input.

FIG. 9 illustrates a communication path between an ISDN network switch 36 and a network termination 40 comprising tandem ISDN-DP units 302A–D of the present invention. Metallic test access is illustrated at various locations along the communication path. A first DDS test unit 45A gains access at two-wire pair 303A adjacent the ISDN network switch 36. From this position, a test operator is able to perform downstream loopback testing of ISDN-DP transmission units 302A–D along paths 304A–D and testing of the network termination 40 along path 304E. A second DDS unit 45B is coupled to the two-wire pair 303C between tandem ISDN-DP units 302B, 302C. From the second unit 45B, a test operator can perform downstream testing along paths 306C–E and may perform upstream testing along paths 306A–B. From a third DDS test unit 45C coupled to two-wire pair 303B, a test operator may perform upstream testing of ISDN-DP unit 302A–D along paths 308A–D.

To use the metallic access feature, the ISDN-DP device connects the T/R pair to a DS0 receiver. However, this must be done with caution since accidental removal of a transmission path would be extremely undesirable. To accomplish this the ISDN-DP device uses an extended loss of transmission as an indication to check for DS0 input via metallic access. The ISDN-DP device will not attempt to check for a metallic connection until loss of 2B1Q signal has persisted for a period of time, for example 45 seconds.

If the ISDN-DP device exceeds this 45 second threshold, it will then switch for a brief period of time, for example 5 seconds, to detect for the presence of a valid DS0 input signal. Note if the ISDN device is in the process of bringing up layer one, the 45 second timer should not terminate this process. Only 45 seconds of the absence of layer one will cause the threshold to be exceeded. Note that other time values could be used and that 45 seconds is merely a design choice.

After detection of a 45 second signal loss, the ISDN-DP device monitors the T/R interface for a valid DS0 signal. This could be accomplished by connecting a DS0 receiver to the T/R pair. The relay connection must be of high impedance and balanced so as not to load down or compromise performance of the loop transmission during normal operation. The DS0 receiver must then determine if a valid DS0 signal is being received. This can be done by first establishing that a valid DS0 signal voltage exists. A typical DS0 receiver, accomplishes this since it requires a signal at a minimum voltage level (e.g. 1.4 Volts).

If the DS0 receiver circuit detects a valid DS0 protocol input signal, further qualification of the input is required to verify that it is a valid signal and not spurious input or a valid loop signal. To do this, the ISDN-DP device verifies that the signal received is a valid AMI encoded signal aligned with the 8 and 64 kHz DDS clocks. A valid AMI-encoded DS0 signal is defined for purposes of the present invention as a signal having no more than two errored seconds detected in a ten second window. An errored second is defined as a second with one or more AMI coding violations. If excessive coding violations are detected, the relay should be switched back to connecting the loop interface to the T/R pair. Coding violations can be detected by monitoring the rails of the received DS0 signal. A properly coded AMI signal will have binary ones on alternate rails. If successive ones are detected on either rail, it is a coding violation. U.S. Pat. No. 5,394,435, incorporated herein by reference discloses a circuit for validating a proper AMI signal.

After the ISDN-DP device has detected a valid DS0 connection via metallic access, it is now ready to perform the various loopback tests. The default state of the preferred embodiment of the ISDN-DP device is to connect the B1 channel to T/R and T1/R1 leads after detecting a valid DS0 input signal on the T/R pair. The B2 and D+ channels could also serve as default channels. This allows the DDS test center to send various test patterns on the B1 channel after DS0 access is established. To request the ISDN BRI device to connect the B2 channel to the T/R and T1/R1 pairs, the test center sends at least one second of All-ones bytes, followed by any other pattern. To request the D+ channel, another burst of All-ones bytes is transmitted. To return to the B1 channel, the test center sends another burst of All-ones bytes.

To allow the network test center to distinguish between which channel is currently under test, the ISDN-DP responds to the reception of loopback enable (LBE) bytes on the DS0 interface differently for B1, B2, and D+. Specifically, if the ISDN BRI device receives greater than 30 LBEs via the DS0 interface and BE is connected, it will return the MAP0 code (S0010011, where S=0 or 1) to the test center on the T1/R1 pair. If the ISDN BRI device receives greater than 30 LBEs via the DS0 interface and B2 is connected, it will return the MAP 1 code (S1101101, where S=0 or 1) to the test center on the T1/R1 pair. This allows the test center to determine which channel is connected to the metallic test interface. For the D+ channel, LBE bytes are returned instead of the MAP0 or MAP1 bytes.

After the DS0 interface is established, the ISDN-DP device is configured to process the DDS latching loopback requests as was done in the case of DCS type access. For example, if the ISDN-DP device receives the DS0-DP latching loopback sequence without any tandem unit steps, then it will enter loopback mode. The processing of far end voice (FEV) and loopback enable (LBE) bytes is performed in the same manner as DCS type access, except all processing is via the metallic access/DS0 interface rather than the D+ channel. Furthermore, the map code returned depends on whether the B1 or B2 channel is connected to the metallic access/DS0 interface. As in DCS test access, receipt of the DDS latching loopback command sequence causes a 2B+D loopback to occur and receipt of the required number of transition-in-progress (TIP) bytes causes the loopback to release. Also, like DCS access, the ISDN-DP converts CSU and DSU latching loopback commands to ISDN eoc activated loopbacks. The ISDN BRI device performs all processing specified above except that it transmits the response codes (e.g., return of far end voice (FEV) bytes and MAP codes) via the DS0 interface on the T1/R1 pair. As mentioned above, the ISDN BRI device will toggle between connecting the B1, B2, and D+ channels to the metallic access/DS0 interface by the receipt of one second bursts of All-ones bytes. The LBE code, as described above, can be used to confirm the channel currently connected to the metallic access/DS0 interface.

D+ channel testing via metallic access can be performed by 9.6 kbps test access. The 9.6 kbps DS0 test signal is mapped into the D channel bits (bits 6 and 7) of the D+ channel as described above.

Figure 10:
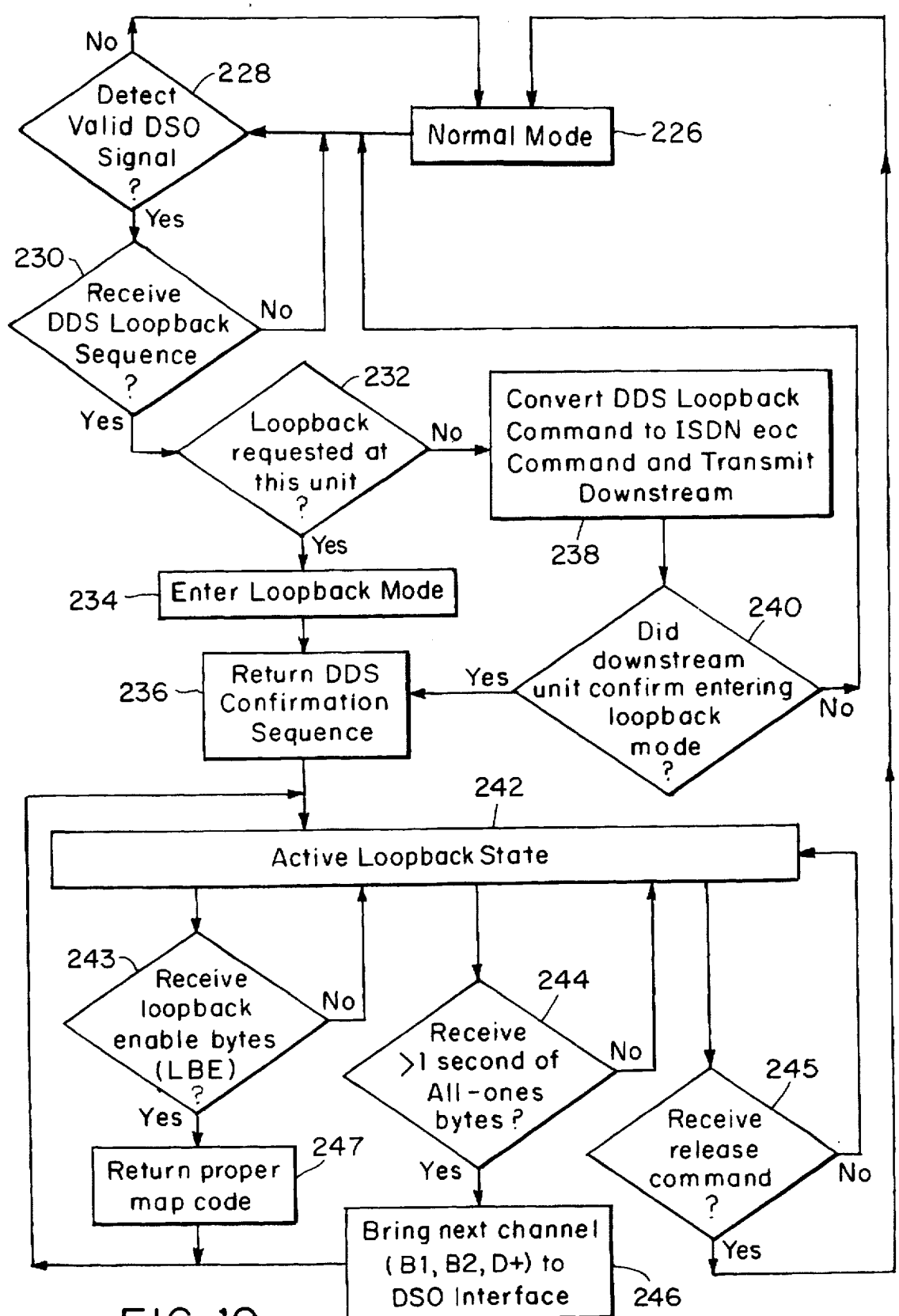
FIG. 10 is a flow diagram representing detection, validation, and processing of loopback commands transmitted from a DS0 metallic interface in accordance with the present invention.

FIG. 10 is a flow diagram representing detection, validation, and processing of loopback commands transmitted from a DS0 interface for metallic test access in accordance with the present invention. In normal mode 226, the ISDN-DP unit of the present invention operates as an ISDN transceiver capable of transmitting and receiving data according to ISDN protocol as described above. When a valid DS0 signal is detected 228, the unit enters DS0 mode 234 and determines whether a valid DDS loopback sequence has been received 230 and if so, whether the loopback sequence is intended for this unit 232. If the DDS loopback command is intended for this unit 232, then the unit enters loopback mode and returns a DDS confirmation sequence to the DDS metallic test unit 236. If the DDS loopback command is intended for a tandem unit 232, then the DDS loopback command is converted to an ISDN eoc command 238 which is transmitted downstream to the tandem unit. After the downstream unit confirms that it has entered loopback mode 240, the ISDN-DP unit returns a DDS loopback confirmation sequence to the DDS test system 236.

At this point, the ISDN-DP unit enters an active loopback state 242 where the unit is continuously monitoring the channel for DDS commands. In this mode, the ISDN-DP connects a default channel (B1,B2,D+) to the metallic access port. In a preferred embodiment, the default channel is the B1 channel, and the B2 and D+ channels can be selected upon receipt of greater than one second of All-ones bytes 244. Upon receipt if greater than one second if All-ones bytes 244, the next channel is connected to the DS0 interface 246. Once the ISDN-DP is configured for loopback on the proper channel, it waits for receipt of a plurality of loopback enable (LBE) bytes 243. Upon receipt of greater than 30 LBEs, a proper map code is transmitted to the DS0 test unit 247. For example, if the B1 channel is activated, a MAP0 code is returned and if the B2 channel is activated, a MAP1 code is returned according to standard DS0 test protocol. However, for the D+ channel, standard protocol does not apply. In this case, a plurality of LBE bytes are returned to the DS0 test unit. After the DS0 test unit confirms that the proper map code has been returned, it initiates an error rate test and the ISDN-DP unit sustains the loopback 242 until a release command is received 245, whereupon the ISDN-DP unit returns to normal mode 226.

Figure 11:
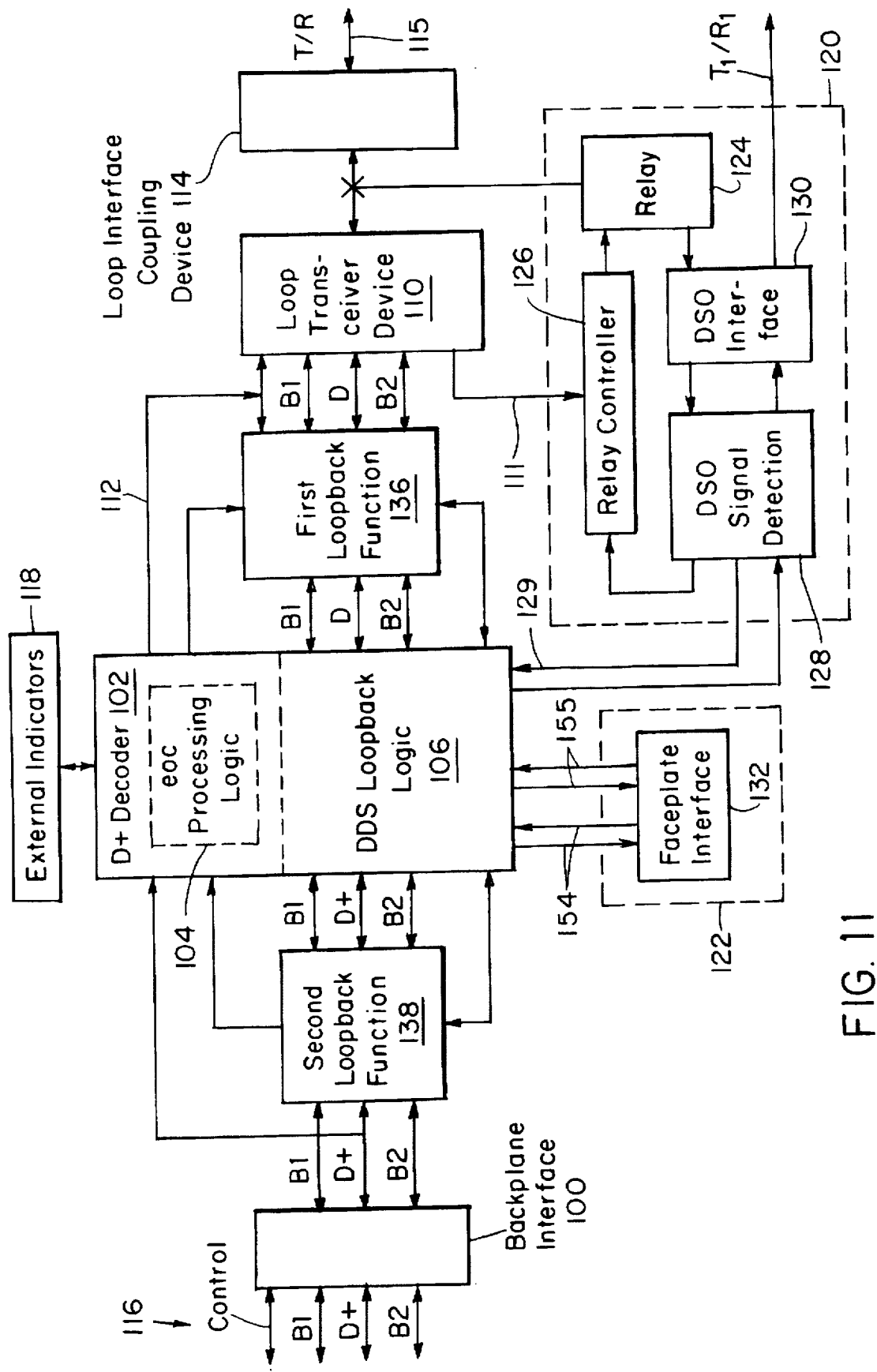
FIG. 11 is a block diagram similar to that of FIG. 6 further representing metallic test access through a DS0 interface and a face plate test access in accordance with the present invention.

FIG. 11 is a schematic view of the ISDN-DP unit of FIG. 6 further including architecture for supporting metallic test access using a DS0 interface 122 and architecture for faceplate access 120 (described below). A multiplexing device, for example a relay 124, is used to control the T/R pair 115 transmitting the ISDN loop signal. Upon indication 111 from the loop transceiver 110 that the 2B1Q signal has been absent, the relay control logic 126 determines if absence of the 2B1Q signal has persisted long enough to scan for a DS0 input signal. If the relay control logic 126 determines that a DS0 signal may be present, it connects the T/R lead 115 through relay 124 to the DS0 interface 130. The DS0 interface, in turn, passes the T/R signal to DS0 signal detector circuitry 128. This circuitry 128 determines if a valid DS0 signal is present. If it is, the relay control logic 126 is notified and the DS0 connection of the T/R lead 115 is maintained. If a DS0 signal is not present, the relay control logic 126 is notified and the T/R connection 115 is returned to the loop transceiver 110.

The input signal 129 from a valid DS0 signal is passed to the DDS loopback logic 106, which monitors the input signal for a valid DDS latching loopback request. If the DS0-DP latching loopback request is received with no tandem unit sequences, then the second loopback function 138 is activated and a loopback is performed. If a DDS tandem latching loopback sequence is received, then the eoc logic block 104 is notified and the appropriate tandem address is populated into an eoc 2B+D loopback command and transmitted over the T1 communication path 116 to an adjacent ISDN unit. The address corresponds to the number of All-ones-LBE iterations received in the tandem unit latching loopback sequence as described above. If a CSU or DSU latching loopback request is received on the DS0 input, then the DDS logic 106 will detect this and request the eoc logic 104 to initiate a 2B+D loopback with address 0, in other words a loopback request to the NT1 device at a customer premises.

In the case of a loopback request, the eoc command decoder 104 monitors the returned eoc signals for a loopback confirmation sequence. If a valid loopback confirmation sequence is received, then the DDS loopback logic 106 is notified. Upon notification, the DDS loopback logic 106 returns far end voice (FEV) bytes on a one-for-one basis to the DDS test unit, and performs loopback enable (LBE) mapping as described earlier.

IV. Faceplate Test Access

A preferred embodiment of the ISDN-DP includes test access connectors on the faceplate of the unit which allow portable DDS test sets to access the ISDN-DP unit. In prior art ISDN channel units, faceplate access would not allow DDS-protocol testing to be executed on the ISDN-protocol device. Prior art ISDN units relied primarily on cumbersome faceplate LED displays with pushbutton menu options for activating and deactivating loopback tests. Prior art ISDN units accommodated faceplate test access for portable ISDN test sets for the purpose of generating and receiving test patterns to verify the integrity of the loopback path established via the pushbutton menus.

In an ISDN-DP of the present invention, the need for a complex and expensive faceplate loopback activation and deactivation procedures is eliminated. Loopbacks on the ISDN circuit can be activated and deactivated from the faceplate using an existing standard DDS test set. The same DDS test set can then be used to perform error rate testing on channels programmed for loopback mode. DDS testing is performed on the ISDN network in a manner which is protocol-transparent to the test operator. Therefore, an operator trained in DDS protocol is fully able to test the ISDN network via faceplate test access on the ISDN-DP unit.

Figure 12:
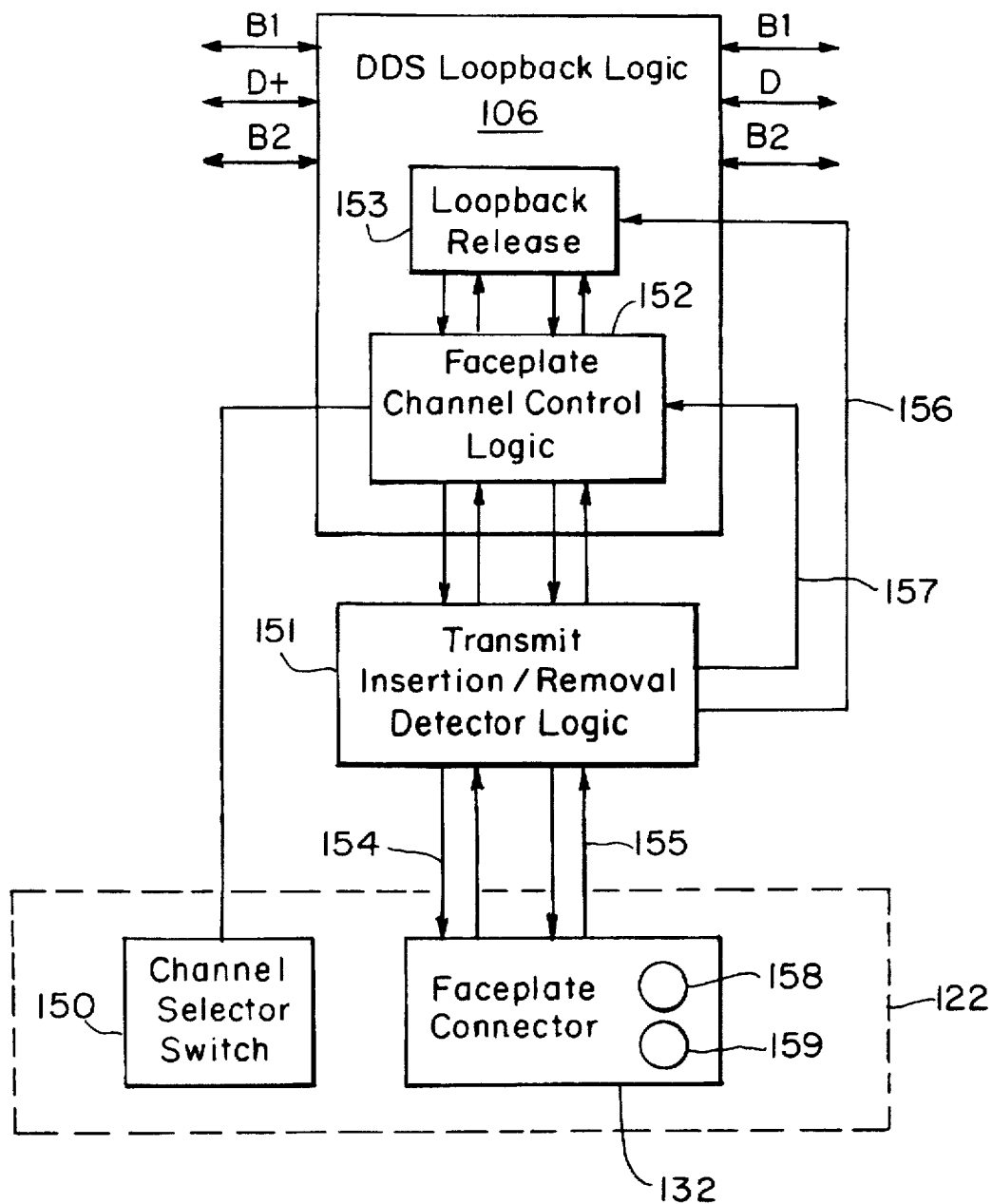
FIG. 12 is a block diagram representing circuitry for supporting face plate test access at an ISDN channel unit in accordance with the present invention.

The ISDN-DP faceplate circuitry illustrated in FIG. 12 accommodates several faceplate-activated loopbacks. A channel selection switch 150 is provided on the faceplate 122 of the ISDN-DP to allow the test operator to select which type of loopback to execute. For example, a preferred embodiment of the switch 150 allows independent execution of a B1, B2, or 2B+D loopback. After placing the channel selection switch in a desired setting, a loopback request from the DDS test set results in a selected B1, B2 or 2B+D loopback test.

Faceplate-accessed tandem unit testing is also supported by converting DDS-protocol tandem loopback requests to ISDN-protocol eoc loopback requests which are transmitted upstream or downstream, depending on the direction of the loopback. The faceplate channel control logic 152 senses the state of the faceplate switch 150 setting and upon receipt of a DDS tandem unit latching loopback request, and converts the loopback request to an ISDN eoc loopback command programmed with the appropriate address. This process is described above in conjunction with DCS and metallic test access.

If a faceplate channel selection switch 150 is not used, the DDS faceplate test features can also be realized using a similar method as that of the metallic access arrangement. In particular, a latching loopback request received at the faceplate 122 preferably results in a 2B+D loopback since this allows access to all channels. As a default, all three channels (B1,B2,D+) can be connected to the ISDN-DP face plate. As with metallic access, each channel can then be sequentially brought to the faceplate by transmitting a sequence of All-ones bytes for greater than one second followed by another sequence. Confirmation can be carried out by sending a LBE code and examining the return byte, as in metallic access. If channel B1 is brought to the faceplate and LBEs are sent, then the return code is MAP0. If B2 is brought to the faceplate and LBEs are sent, then the return code is MAP1. If the D channel is brought to the faceplate and LBEs sent, then LBEs are returned.

A preferred ISDN-DP faceplate testing protocol also supports upstream loopback testing over multiplexed facilities, for example a T1 carrier, to an adjacent ISDN-DP. In this mode, the ISDN-DP permits the latching loopback request to flow through on the D+ channel to the upstream ISDN-DP. In this manner, the upstream ISDN-DP receives this loopback request as if it were a multiplexed bit stream loopback request and responds accordingly. Upstream testing could also be supported in communication paths populated by homogeneous ISDN-DPs. This embodiment could take advantage of unused eoc message space, for example, to communicate upstream loopback requests over the eoc.

The faceplate test access circuitry further includes a detector circuit 151 for sensing whether the test unit faceplate transmit connector is inserted. This serves several purposes which results in several advantages. First, when only the receive 159 connector is inserted into the ISDN-DP, the ISDN-DP serves as a monitor point for each of the channels B1, B2 or D+ based on the setting of the faceplate channel selection switch. Prior art units only allowed access to B1 or B2. Access to the D+ channel provides several unique capabilities such as the ability to monitor from the faceplate each of the bits in the D+ channel including the Zero Byte Suppression indicator for channels B1 and B2. Also, the ISDN overhead bits can be detected and processed non-intrusively (i.e., without impacting the circuit). When the transmit jack 158 is inserted, the ISDN-DP can dynamically change what is presented to the receive jack 159 when the channel selection switch is set to the D+ option. Specifically, the ISDN-DP supports the 9.6 kbps D channel loopback capability from the faceplate test access. When the transmit test connector 159 is inserted, the ISDN-DP reformats the data presented to receive jack 159 (when the channel selection switch is set to D) to the 9.6 kbps format described earlier since insertion of a transmit test connector usually assumes initiation of a DDS test. As an additional capability, a preferred ISDN-DP automatically releases a faceplate activated loopback test where a test operator performing a test removes the test equipment without releasing the established loopback. An ISDN-DP having a transmit test connector insertion detector 151, senses when the transmit jack is removed and in response, generates a signal 156 which triggers the loopback release 153 circuitry to halt the loopback test.

FIG. 12 illustrates preferred architecture for faceplate access. A faceplate test connector 132 includes access to both directions of transmission (i.e. from the T1 or multiplexed bit stream toward the DSL and from the DSL toward the multiplexed bit stream). Each of these directions of transmission, near 155 and far 154, is brought to the faceplate connectors, like a traditional DDS dataport, and the faceplate test set is provisioned to select one of the two directions for test purposes. Transmit Insertion/Removal detector logic 151 senses whether the test connector is inserted into the faceplate for each of the Transmit/Receive directions. If the transmit connector 158 is not inserted, then the transmit/receive in the near 155 direction contain the same data as the transmit/receive connections in the far 154 direction. If the transmit connector is inserted, this is no longer the case, as one of the two transmit and receive directions will fail to contain the same information. One method for determining whether the transmit jack is inserted into the ISDN-DP faceplate is as follows:

1) Continuously monitor the Transmit/Receive Near and Transmit/Receive Far connections on a byte for byte basis. If the transmit/Receive Near bytes are equal and the transmit/Receive Far bytes are equal, then decrement a counter by 1. Note that once the counter reaches a value of 0 any further decrements will not cause the count to go below zero. Also, the initial value of the counter is 0.

2) If the Transmit/Receive Near bytes are not equal or the Transmit/Receive Far bytes are not equal, then increment the same counter by 2. Note that counter should not exceed a pre-defined maximum value, for example 1332. If this value is reached, any further increments will be ignored and the counter will remain at 1332.

3) If the counter reaches a predetermined value such as 1332, then the ISDN-DP will declare that the transmit jack has been inserted. Once the counter reaches the threshold and the ISDN-DP determines that the transmit jack has been inserted, then the ISDN-DP will not declare the transmit jack removed until the count reaches zero.

After an insertion condition is detected, the ISDN-DP knows that the transmit connector from the test set is inserted and can indicate this to the faceplate control logic. The faceplate control logic 152 then can reformat the D channel when brought to the faceplate for D channel testing.

The ISDN-DP continues to monitor the transmit and receive pairs to determine if they return to a state where each pair contains the same data. If this condition is detected, the transmit removal logic 151 indicates to the Loopback Release Command Generator 153 that the transmit connector has been removed and the Loopback Release Command Generator 153 sends a loopback release command to all valid loopback locations.

The Channel Selection Switch 150 is used to determine which of the three channels, B1, B2 or D+ to bring the ISDN-DP faceplate. The channel selection switch 150 can indicate at least three different states which are communicated to the Faceplate Control Logic 152. Depending on the signal received, the faceplate control logic 152 presents one of the three channels, B1, B2 or D+, to the Transmit/Receive Pairs. The faceplate control logic 152 is located in the DDS loopback logic block 106 as described above in FIGS. 6 and 11.

V. Enhanced In-Channel Testing

In some systems employing tandem IDSN-DP devices, the D+ channel may be disabled and unavailable. In these cases, the eoc channel is also unavailable since it is part of the D+ channel bandwidth. As mentioned above, there are some implementations of in-channel testing available today, but these products have significant limitations as described. The ideal solution is for a tandem unit ISDN-DP with the D+ channel disabled to respond to in-channel loopback as if it were a DDS dataport and therefore, not rely on an eoc conversion since the eoc is unavailable across multiplexed bit stream access facilities.

In a preferred embodiment, an ISDN-DP having enhanced in-channel testing processes a latching loopback as follows (Note that it is not necessary to have the D+ channel disabled to perform enhanced in-channel testing). Any in-channel loopback request received with a Loopback Select Code (LSC) of the ISDN-DP, proceeds per Bellcore TA-TSY-000077. If the loopback request is for the unit itself, then the ISDN-DP performs a loopback on the channel that it was received on. For faceplate testing, the channel to be looped back is selected via the faceplate channel selection switch. If the loopback request is for a downstream or upstream tandem ISDN-DP, a tandem unit latching loopback request is transmitted on the desired B channel and the intermediate ISDN-DP units process the latching loopback codes per TA-TSY-000077. The target ISDN-DP receives a complete and valid latching loopback request and perform a loopback on the channel on which the loopback sequence was received.

If a CSU or DSU latching loopback is transmitted in-channel, the ISDN-DP passes it on without processing the command. It is expected that an NT1 device capable of responding to in-channel loopbacks would receive the CSU or DSU latching loopback request and perform a latching loopback.

An advantage of the enhanced in-channel test capability is that is does not rely on the eoc channel to communicate loopback requests. Furthermore, upstream and downstream testing can be performed identically. Of course, to realize the full benefit of enhanced in-channel testing, a homogeneous connection of ISDN-DPs and an NT1 with in-channel test capability would be needed. Also, any in-channel testing includes a risk that with some small, but finite probability, customer data could emulate a DDS loopback activation request.

As shown in FIG. 11, in an ISDN-DP having enhanced in-channel capabilities, both B1 and B2 channels pass through the DDS loopback logic 106. In the direction from the backplane interface 100 to the local loop 114, the DDS loopback logic 106 monitors the BE and B2 channel signals received from the backplane interface 100 through the second loopback function 138. If a DDS latching loopback sequence with a proper loopback select code (LSC), for example, a DS0-DP LSC, is detected on either the B1 or B2 channel, and the latching loopback sequence is a request for a loopback at this unit, then the DDS loopback logic 106 signals the first loopback function 136 to perform a loopback of the B1 or B2 channel. The DDS loopback logic 106 continues to monitor the B1 and B2 channels for a DDS latching loopback release sequence. If a valid release sequence is detected, the DDS loopback logic 106 signals the first loopback function 136 to release the loopback on that channel.

If DS0-DP tandem unit latching loopback sequence is detected by the DDS loopback logic, the procedures detailed in Bellcore document TA-TSY-000077 are carried out by the DDS loopback logic 106. This includes LBE mapping and entering the transparent state. This allows a downstream tandem ISDN-DP unit to respond to the B1 or B2 loopback request.

Enhanced in-channel testing is employed in a similar manner in the upstream direction. The DDS loopback logic 106 monitors the B1 and B2 channels received from the loop transceiver device 110 through the first loopback function 136. If a DDS latching loopback sequence with a proper loopback select code, for example a DS0-DP LSC, is detected on either the B1 or B2 channel and the latching loopback sequence is a request for a loopback at this device, the DDS loopback logic 106 signals the second loopback function 138 to perform a loopback of the B1 and/or B2 channels. The DDS loopback logic 106 continues to monitor the B1 and B2 channel for a DDS latching loopback release sequence. If a valid release sequence is detected, the DDS loopback logic 106 signals the second loopback function 138 to release the B1 or B2 channel.

If a DS0-DP tandem unit latching loopback sequence is received in an upstream direction by the DDS loopback logic 106, the procedures detailed in Bellcore document TA-TSY-000077 are carried out by the DDS loopback logic 106. This includes LBE mapping and entering transparent state. This allows an upstream tandem ISDN-DP unit to respond to the B1 or B2 in-channel DDS latching loopback request issued from a downstream unit or port.

While this invention has been particularly shown and described with references to preferred embodiments thereof, it will be understood by those skilled in the art that various changes in form and detail may be made therein without departing from the spirit and scope of the invention as defined by the appended claims.

Note that for purposes of the present invention, the term "ISDN" includes both switched and non-switched ISDN services. Bellcore document TR-TSY-000398, entitled "Universal Digital Channel" is an example of protocol for a non-switched service, which means that the user does not have to "dial-in" to the network switch to gain access. In a non-switched ISDN service, access is available at any time.

It should also be noted that the present invention is applicable to any intermediate bandwidth protocol technology, and is not limited to current ISDN protocol. The term "intermediate bandwidth" as used herein includes transmission protocols operating at rates of 64 kbps or greater, for example ISDN protocol or future versions of ISDN protocol. Note that ISDN protocol is commonly referred to as "two-wire DSL" protocol while DDS is often referred to as "baseband digital data" protocol.

We claim:

1. A test system comprising:
   a digital communication channel for communicating digital data in a first and a second direction of transmission;
   a DDS-protocol network test unit coupled to the communication channel which transmits digital signals in the first direction and receives digital signals in the second direction, the digital signals comprising a DDS-protocol test command and test data;
   an ISDN-protocol transmission device coupled to the communication channel; the ISDN device comprising a monitoring circuit for receiving the DDS-protocol test command on a portion of the communication channel carrying D+ channel bandwidth in the first direction, and a processing circuit for processing the DDS-protocol test command.

2. The test system of claim 1 wherein the network test unit is coupled to the communication channel at a digital cross-connect system.

3. The test system of claim 1 wherein the network test unit is coupled to the communication channel at a metallic interface.

4. The test system of claim 1 wherein the network test unit is coupled to the communication channel at a faceplate of the ISDN device.

5. The test system of claim 1 wherein the network test unit generates a loopback test command and the ISDN device responds by entering loopback mode, digital test data being received from the network test unit in the first direction on said communication channel and retransmitted to the network test unit in the second direction; the network test unit determining if transmission errors occur on the communication channel between the network test unit and the ISDN device.

6. The test system of claim 5 wherein the network test unit is coupled to the communication channel at a faceplate of a second ISDN device and wherein the loopback test activated by the network test unit determines whether transmission errors occur on the D channel time slot of the communication channel between the network test unit and the ISDN device.

7. An ISDN protocol transmission device comprising:
   a receiver responsive to a DDS protocol test command sequence intended for the receiver and transmitted on a portion of an ISDN protocol digital communication channel carrying D+ channel data; and
   a processing circuit for processing the DDS protocol test command.

8. The ISDN device of claim 7 further comprising an address circuit which decodes address data from the DDS test command; the address circuit further initiating processing of the test command in the ISDN device if the decoded address data is the address of the receiving device.

9. The ISDN device of claim 8 further comprising a conversion circuit which converts the test command to an ISDN embedded operation channel (eoc) command, and transmits the eoc test command over the digital communication channel to an adjacent ISDN device if the decoded address data is not the address of the receiving device.

10. The ISDN device of claim 7 wherein the DDS test command sequence is a loopback command which the ISDN device responds to by entering loopback mode wherein digital test data received in a first direction on the communication channel is retransmitted in a second direction on the communication channel.

11. The ISDN device of claim 10 wherein the DDS test command sequence comprises a loopback release command which the ISDN device responds to by deactivating the loopback mode.

12. The ISDN device of claim 10 wherein the DDS loopback command is selected from the group of commands comprising latching and non-latching loopback commands.

13. The ISDN device of claim 10 wherein the DDS loopback command is encoded for initiating loopback testing in the ISDN device for ISDN protocol channels selected from the group comprising B1-channel, B2-channel, D channel.

14. The ISDN device of claim 10 wherein the DDS loopback command is encoded for initiating loopback testing on a portion of the communication channel carrying D channel data and wherein the ISDN device further comprises a rate adapter for receiving repeated iterations of DDS-protocol loopback test data at a predetermined rate less than the transfer rate of the D channel data, the rate adapter extracting at least one bit from a subset of iterations of DDS test data and inserting the at least one bit on the D channel; the rate adapter further inserting a framing pattern periodically on the D channel to pad the remaining D channel bandwidth to perform loopback testing on the D channel.

15. The ISDN device of claim 14 wherein the predetermined rate is approximately equal to or less than 9.6 kbps.

16. The ISDN device of claim 7 wherein the ISDN device receives the DDS test command sequences on said ISDN protocol digital communication channel in an upstream direction.

17. A method for testing an ISDN-protocol digital communication channel comprising the steps of:

coupling an ISDN-protocol transmission device to the communication channel;

monitoring a portion of the communication channel carrying D+ channel data for DDS-protocol test command sequences; and processing the DDS-protocol test command sequences.

18. The method of claim 17 further comprising the steps of:

decoding address data from the DDS-protocol test command sequence; and processing the test command in the ISDN device if the decoded address data is the address of the receiving device.

19. The method of claim 18 further comprising the steps of:

converting the DDS-protocol test command sequence to an ISDN-protocol embedded operation channel (eoc) test command sequence; and transmitting the eoc test command sequence over the digital communication channel to an adjacent ISDN-protocol transmission device, if the decoded address data is not the address of the receiving device.

20. The method of claim 17 further comprising the step of entering loopback mode wherein digital test data received in a first direction on the digital communication channel is retransmitted in a second direction on the communication channel upon receipt of a DDS-protocol loopback test command sequence.

21. The method of claim 20 further comprising the steps of:

entering loopback mode on the portion of the communication channel carrying D channel data;

receiving repeated iterations of DDS-protocol loopback test data at a rate less than the transfer rate of the D channel data;

extracting at least one bit from a subset of iterations of DDS test data;

inserting the at least one bit on the D channel; and periodically inserting a framing pattern on the D channel to pad the remaining D channel bandwidth.

22. An intermediate bandwidth digital transmission device comprising:

a receiver circuit responsive to a baseband digital data protocol test command sequence intended for the receiver and transmitted on a portion of intermediate digital communication channel carrying at least overhead data; and a processing circuit for processing the test command.

23. The device of claim 22 wherein the baseband digital data protocol comprises DDS protocol.

24. The device of claim 22 wherein the intermediate bandwidth channel comprises an ISDN protocol channel.

25. The device of claim 22 further comprising an address circuit which decodes address data from the baseband digital data protocol test command; the address circuit further initiating processing of the test command in the transmission device if the decoded address data is the address of the device.

26. The device of claim 25 further comprising a conversion circuit which converts the test command to a test command consistent with the intermediate bandwidth protocol and transmits the converted test command over the digital communication channel to an adjacent intermediate bandwidth digital transmission device if the decoded address data is not the address of the device.

27. The device of claim 22 wherein the DDS test command sequence is a loopback command which the device responds to by entering loopback mode wherein digital test data received in a first direction on the communication channel is retransmitted in a second direction on the communication channel.

* * * * *